US012746947B1

(12) United States Patent
Gao et al.

(10) Patent No.: US 12,746,947 B1
(45) Date of Patent: Sep. 29, 2026

(54) COLLISION FILTERING BASED ON SEGMENTATION DATA AND OBJECT TRACKING

(71) Applicant: Zoox, Inc., Foster City, CA (US)

(72) Inventors: Xiang Gao, Mountain View, CA (US); Jie Lin, San Jose, CA (US); Li Yon Tan, Foster City, CA (US); Haoran Yu, Milpitas, CA (US); Yihang Zhang, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 202 days.

(21) Appl. No.: 18/524,604

(22) Filed: Nov. 30, 2023

(51) Int. Cl.
*B60W 60/00* (2020.01)
*B60W 30/09* (2012.01)

(52) U.S. Cl.
CPC ........ *B60W 60/0016* (2020.02); *B60W 30/09* (2013.01); *B60W 2554/40* (2020.02)

(58) Field of Classification Search
CPC .. B60W 60/0016; B60W 30/08; B60W 30/09; B60W 2554/40
See application file for complete search history.

(56) References Cited

U.S. PATENT DOCUMENTS 10,535,138 B2 1/2020 Pfeiffer
10,649,459 B2 5/2020 Wang
11,912,268 B2 2/2024 Hendy
2016/0129907 A1* 5/2016 Kim .................... G06V 20/588 701/26
2020/0324762 A1* 10/2020 Pfadler .................. G08G 1/167
2021/0103285 A1* 4/2021 Philbin .................. G05D 1/617
2021/0366130 A1* 11/2021 Dong ........................ G06T 7/20
2023/0192132 A1* 6/2023 Oh ...................... B60W 30/095 701/26

(Continued)

FOREIGN PATENT DOCUMENTS

CN 110843772 A * 2/2020 ............ B60W 30/08
KR 20230026223 A * 2/2023 ............ B60W 30/08

OTHER PUBLICATIONS

Machine translation of KR-20230026223-A (Year: 2023).*

(Continued)

*Primary Examiner* — Navid Z. Mehdizadeh
*Assistant Examiner* — Caitlin R Mccleary
(74) *Attorney, Agent, or Firm* — Lee & Hayes, P.C.

(57) ABSTRACT

Techniques for filtering candidate collisions with objects in an environment are discussed herein. A vehicle may receive sensor data representative of the environment. The vehicle can evaluate such sensor data and generate instance segmentation maps that represent the environment at a future time. The vehicle can determine instance prediction maps based on the instance segmentation maps and the velocity associated with the instances included therein. The vehicle can analyze such instance prediction maps to determine whether the vehicle is predicted to collide with any of the instances. Upon identifying a potential interaction, the vehicle can determine whether the instance is located, at a future instance prediction map that is prior to the map in which the potential interaction occurs, substantially behind the vehicle. Based on the instance being located behind the vehicle, the vehicle may filter out the potential interaction from further processing and control the vehicle accordingly.

20 Claims, 7 Drawing Sheets

(56) References Cited

U.S. PATENT DOCUMENTS

| | | | | |
|---|---|---|---|---|
| 2023/0252638 | A1* | 8/2023 | Hotson | G06V 10/7747 382/157 |
| 2024/0034308 | A1 | 2/2024 | Agrawal | |

OTHER PUBLICATIONS

Machine translation of CN-110843772-A (Year: 2020).*
U.S. Appl. No. 18/193,285, filed Mar. 30, 2023, Clawson, et al., "Collision Avoidance With Trajectory Evaluation", 52 pages.

* cited by examiner

FIG. 4
400
INSTANCE SEGMENTATION MAP 402
VEHICLE 404
TRAJECTORY 406
VEHICLE STATE 408
INSTANCE 410

| α | β | α THRESHOLD | β THRESHOLD |
|---|---|---|---|
| 15 DEGREES | 30 DEGREES | 20 DEGREES | 35 DEGREES |

COLLISION FILTERING BASED ON SEGMENTATION DATA AND OBJECT TRACKING

BACKGROUND

A vehicle, such as an autonomous vehicle, may include and utilize various sensor devices to detect static and/or dynamic objects within the environment. In some instances, the vehicle can analyze such sensor data to predict future actions of the various object(s) proximate the vehicle. The vehicle may determine whether the predicted action of the object is predicted to interact with the vehicle. The vehicle can use such interaction data to determine or otherwise plan vehicle actions. However, in some cases, techniques for determining whether objects in the environment are predicted to interact with the vehicle and/or actions based on such interactions can lead to inaccurate and/or suboptimal results.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
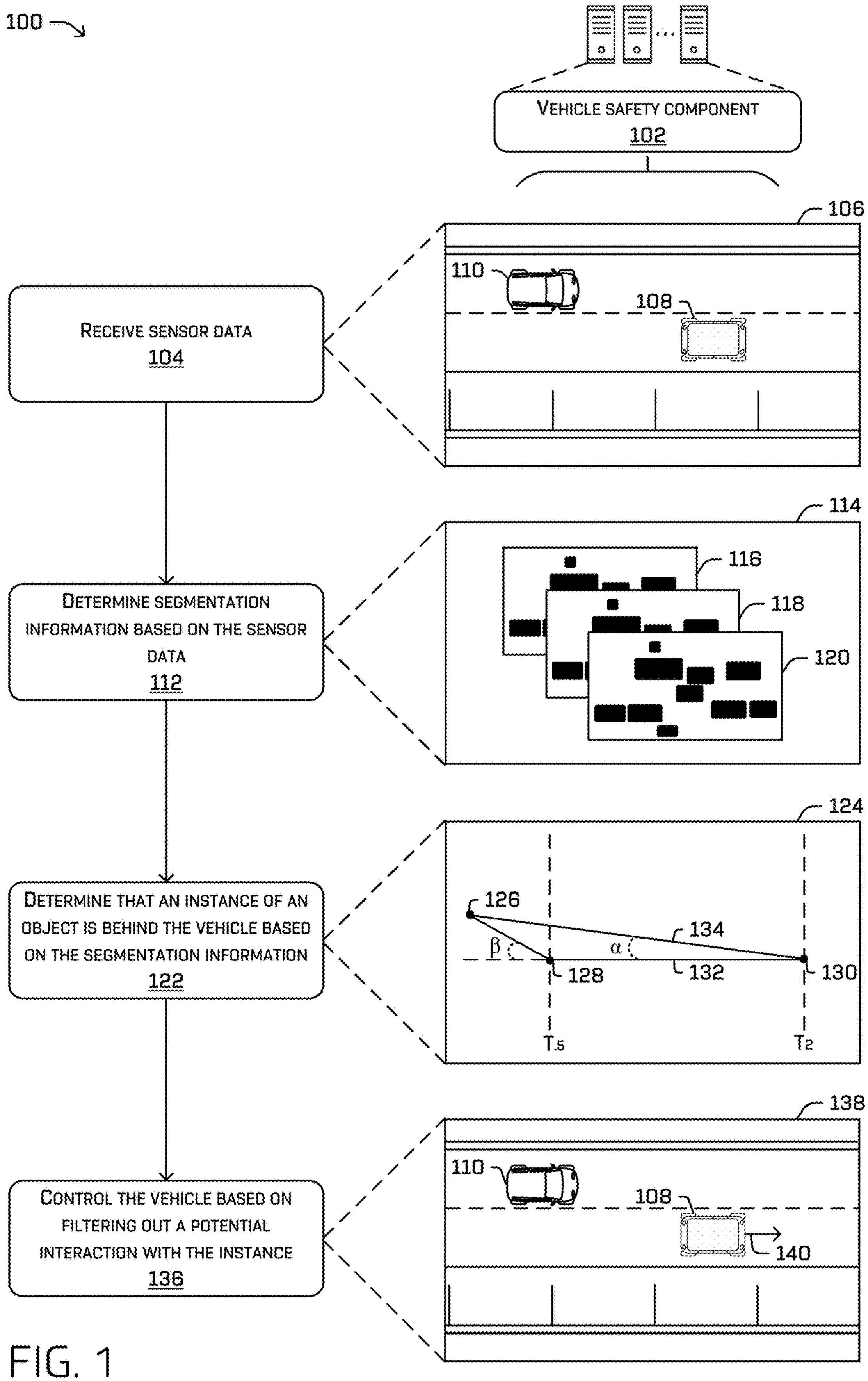
FIG. 1 is a pictorial flow diagram illustrating an example technique for receiving sensor data, determining segmented representations based on the sensor data, determining a rear collision based on the segmented representations, and controlling a vehicle based on the rear collision, in accordance with one or more examples of the disclosure.

As described above, conventional techniques for determining whether objects in the environment are predicted to interact with the vehicle and/or the actions for the vehicle to follow based on such interactions can lead to inaccurate and/or suboptimal results. Such inaccuracies may result in suboptimal behavior of the vehicle.

Techniques for filtering candidate collisions with objects in an environment are discussed herein. In some examples, a vehicle (such as an autonomous vehicle) may receive sensor data representative of the environment. The vehicle can evaluate such sensor data and generate one or more instance segmentation maps that represent the environment at one or more future times. The instance segmentation maps may represent instances (e.g., blobs or groups of pixels) representative of one or more objects in the environment such that each group of data representative of an object may be distinguished (e.g., using a unique id) from other objects of the same and/or different classes. The vehicle can determine instance prediction maps based on the instance segmentation maps and the velocity associated with instances of objects (also referred to as “object instances” or simply “instances”) included therein. In some examples, the vehicle can analyze such instance prediction maps to determine whether the vehicle is predicted to collide with any of the object instances at a future time. Upon identifying a potential interaction (e.g., collision) of the vehicle with an object instance, the vehicle can determine whether the instance is, at a future instance prediction map that is prior to the map in which the potential interaction occurs, located substantially behind the vehicle. Based on the instance being located behind the vehicle, the vehicle may filter out the potential interaction from further processing and control the vehicle accordingly. As described in more detail below, the techniques described herein may improve vehicle safety and driving efficiency by determining whether an object included in a potential interaction is behind the vehicle, thereby enabling the vehicle to proceed within the environment without increasing the likelihood of the potential interaction. Such techniques may result in providing a more accurate understanding of the environment and enable the vehicle to generate more efficient and accurate actions.

When evaluating predicted interactions with object(s) in an environment, conventional systems and/or techniques may be inefficient and/or lead to inaccurate or suboptimal results. For example, while traversing an environment, a vehicle can receive and analyze sensor data captured by one or more sensor devices mounted thereto. When analyzing the sensor data, the vehicle can detect and/or classify one or more objects proximate the vehicle. In some instances, when determining the efficacy and/or safety of the candidate trajectories, the vehicle may evaluate the predicted actions of such object(s). In evaluating the candidate trajectories, the vehicle may determine that the vehicle and the object may interact (or collide) at a future time. In such instances, the vehicle may determine an action that instructs the vehicle to slow down to reduce the likelihood of collision. However, in some cases, slowing down may increase the likelihood that the vehicle and the object collide. Specifically, in some examples, the object may be located behind the vehicle (in the same or adjacent driving lane) and traveling in a same direction as the vehicle. In such instances, when determining whether the object and the vehicle may collide at a future time, one or more components may overestimate the velocity of the object which may indicate the object will intersect with the vehicle trajectory at a specific time. Accordingly, if the vehicle abruptly slows down to avoid the collision, such actions may increase the likelihood of a rear end collision (e.g., with another object), or at least result in the vehicle braking unnecessarily. Consequently, the limitations of the conventional techniques may misidentify potential collisions, which may increase the likelihood of rear end collisions and/or result in unnecessary braking.

To address these and other technical problems and inefficiencies, the systems and/or techniques described herein include a vehicle safety system (which also may be referred to as a "vehicle safety component" or "vehicle component") configured to identify and/or filter out (or tag) potential collisions in which the instance is located behind the vehicle. That is, filtering out or otherwise tagging such potential collisions may cause the vehicle to refrain from reducing velocity which would in turn increase the likelihood of a rear end collision. Technical solutions discussed herein solve one or more technical problems by minimizing a chance that the vehicle will misdiagnose a potential rearend collision and avoiding unnecessary braking which could increase the likelihood of a rear end collision.

In some examples, a vehicle safety component may receive sensor data from one or more sensor devices while traversing an environment. In some examples, the vehicle may include multiple sensor devices (e.g., lidar device(s), radar device(s), time-of-flight device(s), image capturing device(s), etc.) configured to receive sensor data of the environment. Such sensor devices may be located at any location on or in the vehicle and may capture sensor data of any portion of the environment. In some examples, each sensor device may provide unique sensor data representative of the perspective of the particular sensor.

In some examples, the vehicle safety component may determine semantic segmentation maps based on the sensor data. A semantic segmentation map may be a map, image, graph, and/or frame that includes a plurality of pixels that are assigned with a specific class of object (e.g., vehicle, pedestrian, etc.). That is, the semantic segmentation map may be a 2D representation of the environment. Each pixel in the map may include data that corresponds to a location of the 3D physical environment. Further, the pixels may include confidence level data and/or velocity data. The confidence level data may represent the degree (or level) of confidence that there is an object at the pixel location at the specified time. The velocity data may represent the predicted velocity of the object corresponding to the pixel.

In some instances, the vehicle safety component may determine one or more semantic segmentation maps (e.g., segmented representations) at various times in the future. That is, the vehicle safety component may determine multiple maps at different time intervals into the future. For example, the vehicle safety component may determine a first map at a current time to, a second map at time $t_{0.5}$ (e.g., 0.5 seconds into the future), a third map at time $t_1$ (e.g., 1 second into the future), a fourth map at time $t_{1.5}$ (e.g., 1.5 seconds into the future), and/or a fifth map at time $t_2$ (e.g., 2 seconds into the future). However, this is not intended to be limiting; in other examples, the vehicle safety component may determine more or less maps at different intervals and/or extending beyond 2 seconds into the future. The vehicle safety component may determine the semantic segmented maps based on providing the sensor data as input to a machine-learned model trained to output such semantic segmented maps. Example techniques for generating a semantic segmentation maps can be found, for example, in U.S. Pat. No. 10,535,138, issued Jan. 14, 2020, and titled "Sensor Data Segmentation," the content of which is herein incorporated by reference in its entirety and for all purposes.

In some examples, the vehicle safety component may determine instance segmented maps (e.g., instance representations, object segmentation maps, object representations, etc.) based on the semantic segmentation maps. An instance segmentation map may be a map, image, graph, and/or frame that includes identified instances (or objects) (e.g., blob or group of pixels) that are assigned with a specific class of object (e.g., vehicle, pedestrian, etc.). In such instances, each instance (or object) in the map may include a unique instance identifier (e.g., first vehicle, second vehicle, etc.). The instance segmentation map may be a 2D representation of the environment. Each instance in the instance segmentation map include data that corresponds to an object in the 3D physical environment. That is, an instance may include data such as size data, shape data, type data, location data, pose data, etc. The vehicle safety component may determine the instance segmented maps based on providing the semantic segmented maps and/or sensor data as input to a machine-learned model trained to output such instance segmented maps. That is, the vehicle safety component may receive a first instance segmented map at a current time $t_0$, a second instance segmented map at time $t_{0.5}$ (e.g., 0.5 seconds into the future), a third instance segmented map at time $t_1$ (e.g., 1 second into the future), a fourth instance segmented map at time $t_{1.5}$ (e.g., 1.5 seconds into the future), and/or a fifth instance segmented map at time $t_2$ (e.g., 2 seconds into the future). In such instances, the first instance segmented map at $t_0$ may correspond to the first semantic segmentation map at $t_0$, the second instance segmented map at $t_{0.5}$ may correspond to the second segmentation map at $t_{0.5}$, etc. Example techniques for generating an instance segmentation map can be found, for example, in U.S. Pat. No. 10,535,138, issued Jan. 14, 2020, and titled "Sensor Data Segmentation," the content of which is herein incorporated by reference in its entirety and for all purposes.

In some examples, the vehicle safety component may determine instance (or object) prediction maps (e.g., predicted representations) based at least in part on the instance segmentation maps. An instance prediction map may be a map, image, graph, and/or frame that includes the predicted location of the one or more instances (or objects) at a specific moment in time. For instance, the vehicle safety component may determine an instance prediction map that predicts, based on the instance segmentation map at $t_1$, where the instances may be located at $t_{1.5}$. The vehicle safety component may determine the instance prediction maps based on the instance segmentation maps and the instance velocity data. Specifically, the vehicle safety component may predict the future locations of the instance(s) based on the predicted velocity of such instances. The vehicle safety component may determine the velocity data of the instance based on the velocity data of the pixels corresponding to the instance. That is, each instance may include pixel identifier data that identifies which pixels of the semantic segmentation map correspond to which instance in the instance segmentation map. Further, as described above, each pixel in the semantic segmentation map may include a predicted velocity of the data stored at the pixel location. As such, the vehicle safety component may determine the instance velocity based on determining an average velocity of the pixels corresponding to the instance.

In some examples, the vehicle safety component may determine instance tracking maps (or object tracking maps) based on the instance prediction maps. An instance tracking map may be a map, image, graph, and/or frame that includes the tracked location of each instance (or object). That is, the vehicle safety component may evaluate the instance prediction maps (e.g., at $t_0$, $t_{0.5}$, $t_1$, $t_{1.5}$, and $t_2$) and determine a track for each instance between each map. In some instances, the vehicle safety component may randomly (or semi-randomly) assign each instance an instance identifier when generating the instance segmentation maps. As such, the same instance may include different instance identifiers in two different maps (e.g., instance identifier of 'vehicle 1' in the map at $t_1$ and an instance identifier of 'vehicle 2' in the map at $t_{1.5}$). Accordingly, the vehicle safety component may evaluate such instance prediction maps to ensure that a single instance has the same instance identifier across each of the instance tracking maps. That is, the instance tracking map at $t_1$ may be a map that includes updated instance identifiers which may correspond to the instance prediction map at $t_1$. The vehicle safety component may update the instance identifiers based on the velocity and location data associated with such instances. For example, if an instance is located at a certain position in an instance prediction map at $t_1$, the sensor management component may determine where the instance should be located at $t_{1.5}$ by evaluating the velocity data of the instance. Accordingly, the vehicle safety component may identify an instance at the predicted location in the instance prediction map at $t_{1.5}$ and updated the instance identifier to be the same as the instance identifier in the instance prediction map at $t_1$.

In some examples, the vehicle safety component may determine whether there is a potential collision between the vehicle and an instance (or object) in one of the instance tracking maps. A potential collision may be an interaction between the vehicle and an instance in which the positions of such entities physically and temporally overlap and/or are within a threshold distance of one another. In some examples, the vehicle safety component may receive a candidate trajectory for the vehicle to follow through the environment. The candidate trajectory may include state data that describes the pose, velocity, acceleration, steering angle, etc. of the vehicle at a specific moment in time. As such, the vehicle safety component may determine that there is a potential collision based on one of the future trajectory states overlapping with an instance. That is, the vehicle safety component may identify the candidate trajectory state at $t_0$ and determine whether the state overlaps physically with one or more of the instances in the instance tracking map at $t_0$, identify the candidate trajectory state at $t_{0.5}$ and determine whether the state overlaps physically with one or more of the instances in the instance tracking map at $t_{0.5}$, identify the candidate trajectory state at $t_1$ and determine whether the state overlaps physically with one or more of the instances in the instance tracking map at $t_1$, etc. If the vehicle safety component determines that a state of the candidate trajectory overlaps with one of the instances in one of the instance tracking maps, the vehicle safety component may determine that there is a potential collision.

Based on identifying that there is a potential collision, the vehicle safety component may determine, based on a relative position between the vehicle and the instance, whether to filter out or otherwise tag the potential collision based on the instance being located substantially behind the vehicle. That is, the vehicle safety component may leverage the instance tracking maps to track the locations (or relative locations/positions) of the instance at times prior to the time of the potential collision. For example, if the potential collision is at time $t_2$, the vehicle safety component may use the instance tracking maps to determine the location of the specific instance at $t_{1.5}$, $t_1$, $t_{0.5}$, and/or $t_0$. If the instance is located behind the vehicle at one or more of these times, the vehicle safety component may determine that the instance may be approaching the vehicle from behind. In such instances, the vehicle safety component may filter such a collision out (e.g., exclude the potential collision from further processing). Alternatively or additionally, the vehicle safety component may associate data with the potential collision that indicate the potential collision is unlikely to occur. For example, the vehicle safety component may tag the potential collision as an inaccurate collision, modify a confidence level associated with the potential collision (e.g., lower a confidence level indicating that vehicle safety component has a low confidence that the potential collision is an accurate or a viable collision), etc. In such examples, the vehicle safety component may send such data (e.g., the potential collision and the data associated thereto) to downstream components which may verify the validity to such tags and/or confidence levels. Accordingly, downstream components may determine a vehicle action based on the data sent by the vehicle safety component.

In some examples, the vehicle safety component may determine whether an instance is substantially behind the vehicle based on evaluating one or more angles associated with the vehicle and the instance across multiple instance tracking maps. That is, the vehicle safety component may determine a first angle based on an absolute displacement between the vehicle and/or instance across multiple maps. That is, the vehicle safety component may determine a first absolute displacement between the location of the vehicle in the first instance tracking map (e.g., the first instance tracking map in which the instance is present) and the location of the vehicle at the location of the potential collision. The first absolute displacement may be represented by a (first) line (or directed vector) between the vehicle location in the first instance tracking frame and the vehicle location in the potential collision frame. Additionally, the vehicle safety component may determine a second absolute displacement between the location of the instance in the first tracking map and the location of the instance at the potential collision. The second absolute displacement may be represented by a (second) line (or directed vector) between the instance location in the first instance tracking map and the instance location at the location of the potential collision. In such cases, the first angle may be the angle between the first and second lines (or vectors).

Further, the vehicle safety component may determine a second angle based on an absolute displacement of the vehicle between the two maps and a relative displacement between the instance and the vehicle in the first instance tracking frame. That is, the vehicle safety component may determine a first displacement between the location of the vehicle in the first instance tracking map and the location of the vehicle at the location of the potential collision. The vehicle safety component may determine a relative displacement between location of the instance in the first tracking map and the location of the vehicle in the first tracking map. The first absolute displacement may be represented by a (first) line (or directed vector) between the vehicle location in the first instance tracking frame and the vehicle location at the potential collision location. The second absolute displacement may be represented by a (second) line (or directed vector) between the instance location in the first instance tracking frame and the vehicle location in the first instance tracking map. As such, the second angle may be the angle between the first and second lines (or vectors).

In some examples, the vehicle safety component may determine that the instance is substantially behind the vehicle based on comparing the first and second angles to angle thresholds. That is, the first angle may be compared to a first angle threshold or threshold range (e.g., 0°, 10°, 20°, 30°, between 0°-10°, between 0°-30°, etc.) and the second angle may be compared to a second angle threshold or threshold range (e.g., 0°, 10°, 20°, 30°, between 0°-10°, between 0°-30°, etc.). In such cases, if the first and/or second angles are below the first and/or second thresholds, the vehicle safety component may determine that the instance is substantially behind the vehicle. Conversely, if the first and/or second angles meet or exceed the first and/or second thresholds, the vehicle safety component may determine that the instance is not substantially behind the vehicle. If the vehicle safety component determines that the instance is behind the vehicle, the vehicle safety component may filter the potential collision out and exclude the potential collision from further evaluation. Alternatively, the vehicle safety component may tag and/or modify data (e.g., confidence levels) associated with the potential collision and send such data for additional downstream processing. However, if the vehicle safety component determines that the instance is not behind the vehicle, the vehicle safety component may include the potential collision in further evaluations (e.g., subsequent predictions).

Alternatively or additionally, in other examples, the vehicle safety component may determine a score associated with the potential collision. The score may represent the potential danger to the vehicle and/or the occupants of the vehicle based on the collision occurring. In some examples, the vehicle safety component may determine a first score based on the danger associated with the potential collision if the vehicle reduces its velocity and a second score based on the danger associated with the potential collision if the vehicle maintains a current velocity. The vehicle safety component may determine the first and second scores based on various factors, such as a location of the potential collision in the environment (e.g., intersection (e.g., increased likelihood for additional interactions), freeway (e.g., increases score based on the high velocity), etc.), a location of the potential collision to the vehicle (e.g., lower score based on the collision to a longitudinal end of the vehicle, increase score based on the collision to a lateral end of the vehicle, etc.), a location of the occupant(s) within the vehicle (e.g., increase score if the occupant is located on the side of the potential collision), a relative velocity between the vehicle and the instance (e.g., increase score for higher relative velocity (e.g., higher potential for danger), lower score for low relative velocity, etc.), a relative pose (or heading) between the vehicle and the instance (e.g., increase score if there is a large relative heading, decrease score if there is a low relative heading, etc.), and/or any other factor. Based on determining the first and second scores, the vehicle safety component may determine whether to instruct the vehicle to modify (e.g., reduce or increase) velocity (or any other type of kinematic parameter) or to maintain a current velocity. That is, if the first score is lower than the second score, the vehicle safety component may instruct the vehicle to reduce vehicle velocity. If the second score is lower than the first score, the vehicle safety component may instruct the vehicle to maintain the current velocity of the vehicle. In such instances, the vehicle may be controlled based on the action determined by the vehicle safety component.

In some examples, the techniques described herein may be performed by a secondary system running on a low-level computing system. The secondary system may run on segregated hardware from a primary system of a vehicle. In some examples, the secondary system (e.g., the vehicle safety component) may be implemented separately from the vehicle computing device (e.g., the primary system) to provide redundancy, error checking, or validation of determinations and commands from the primary system.

The techniques described herein can improve the functioning, safety, and efficiency of the autonomous and semi-autonomous vehicles operating in various driving environments. Tracking instance locations between instance segmentation maps can enable to the vehicle to have an increased understanding about where the instances are and may be located in the environment at future times. Specifically, such instance tracking maps may ensure that the vehicle is able to determine whether the instance is located behind the vehicle. Such a determination can significantly reduce the likelihood of a rear end collision.

The techniques described herein may be implemented in several ways. Example implementations are provided below with reference to the following figures. Although discussed in the context of an autonomous vehicle, the methods, apparatuses, and systems described herein may be applied to a variety of systems, and are not limited to autonomous vehicles. In another example, the techniques may be utilized in an aviation or nautical context, or in any other system. Additionally, the techniques described herein may be used with real data (e.g., captured using sensor(s)), simulated data (e.g., generated by a simulator), or any combination of the two.

FIG. 1 is a pictorial flow diagram illustrating an example process 100 for receiving sensor data, determining segmented representations based on the sensor data, determining a rear collision based on the segmented representations, and controlling a vehicle based on the rear collision. As shown in this example, some or all of the operations in the example process 100 may be performed by a vehicle safety component 102, a perception component, prediction component, a planning component, and/or any other component or systems within an autonomous vehicle. For instance, as shown in this example, example process 100 may be implemented using a vehicle safety component 102. As described below in more detail, the vehicle safety component may include various components, such as a semantic segmentation component, an instance segmentation component, an instance prediction component, an instance tracking component, a collision predicting component, a collision scoring component, and/or a vehicle action component.

At operation 104, the vehicle safety component 102 may receive sensor data. In some examples, a vehicle may include multiple sensor devices mounted at various locations and various angles relative to the vehicle, to capture sensor data of a driving environment. For example, box 106 illustrates a vehicle navigating an environment including an object. In this example, the box 106 may include a vehicle 108 capturing sensor data while moving throughout the environment. As shown, the box 106 may also include an object 110 navigating in a same direction as the vehicle 108. In such instances, the object 110 may be a vehicle; however, in other example, the object 110 may be any other type of static or dynamic object. Further, in other examples, the box 106 may include more or fewer objects proximate the vehicle 108.

At operation 112, the vehicle safety component 102 may determine segmentation information based on the sensor data. In some examples, the vehicle safety component 102 may evaluate the sensor data to determine whether the vehicle 108 may be predicted to interact (or collide) with an object in the environment. As such, the vehicle safety component 102 may generate one or more segmentation maps based on inputting the sensor data to a machine-learned model. For example, box 114 may illustrate multiple different segmentation maps. As shown, box 114 may include an instance segmentation map 116, an instance segmentation map 118, and an instance segmentation map 120. In some examples, each of the segmentation maps may represent the environment at a future time. That is, the instance segmentation map 116 may be a representation of the environment at time $t_0$, the instance segmentation map 118 may be a representation of the environment at time $t_1$ (e.g., 1 second into the future), and the instance segmentation map 120 may be a representation of the environment at time $t_2$ (e.g., 2 seconds into the future). In some examples, each of the segmentation maps may include a plurality of instances (e.g., a group or blob of pixels assigned to the same object type). Such instances may be represented by the black rectangles. Of course, this example is not intended to be limiting; in other examples, the vehicle safety component 102 may generate more or fewer instance segmentation maps and differing timer intervals. Additional detail about how to generate and/or evaluate the segmentation maps may be discussed in FIGS. 2-5.

At operation 122, the vehicle safety component 102 may determine that an instance of an object is behind the vehicle based on the segmentation information (or maps). In some examples, the vehicle safety component 102 may evaluate the segmentation maps (determined at operation 112) to determine whether the vehicle is anticipated to collide with one or more of the instances found therein. In such instances, the vehicle safety component 102 may determine whether a future state (e.g., based on a candidate trajectory of the vehicle 108) of the vehicle 108 overlaps physically and temporally with an instance in one of the segmentation maps (and/or within a threshold distance between). Additional detail about how to detect a potential collision may be discussed in FIGS. 2, 4, and 5. If a future state of the vehicle 108 overlaps with one of the instances in one of the instance segmentation maps, the vehicle safety component 102 may determine that the vehicle 108 may be predicted to collide with the instance.

In some examples, the vehicle safety component 102 may determine whether the instance is located behind the vehicle 108. That is, based on the vehicle safety component 102 determining that there may be a potential collision between the instance and the vehicle 108, the vehicle safety component 102 may evaluate the relationship between such entities at different timesteps. In some instances, the vehicle safety component 102 may identify the earliest (or first) segmentation map within which the instance is present. In such instances, the vehicle safety component 102 may determine a first angle based on a first vector (or direction) between the vehicle 108 location in a first instance tracking map (e.g., the first instance tracking map in which the instance is present) and the vehicle 108 location at the point of collision and a second vector between the instance location in the first instance tracking map and the instance location at the point of collision. Further, the vehicle safety component 102 may determine a second angle based on the first vector as described above and a third vector between the vehicle 108 location in the first instance tracking map and the instance location in the first instance tracking map. For example, box 124 illustrates the various angles based on the vehicle 108 and the instance. In this example, the point 126 may represent the location of the instance in the first segmentation map (e.g., at $t_{0.5}$) in which the instance is present, the point 128 may represent the location of the vehicle 108 in the first segmentation map (e.g., at $t_{0.5}$) in which the instance is present, the point 130 may represent the location of the potential collision at $t_2$, the line 132 may represent a candidate trajectory of the vehicle 108, and the line 134 may represent a tracked trajectory of the instance. As shown, the first angle may be the alpha angle which may measure the angle between the line 134 and the line 132, and the second angle may be the beta angle which may measure the angle between the line 132 and the vector between the point 126 and the point 128. In such instances, the vehicle safety component 102 may compare the first and second angles to a threshold to determine whether the instance is substantially behind the vehicle 108. If the first and/or second angles are below the first and/or second thresholds, the vehicle safety component 102 may determine that the instance is substantially behind the vehicle. Conversely, if the first and/or second angles meet or exceed the first and/or second thresholds, the vehicle safety component 102 may determine that the instance is not substantially behind the vehicle. If the vehicle safety component determines that the instance is behind the vehicle, the vehicle safety component 102 may filter the potential collision out and exclude the potential collision from further evaluation. However, if the vehicle safety component 102 determines that the instance is not behind the vehicle, the vehicle safety component 102 may include the potential collision in further evaluations.

At operation 136, the vehicle safety component 102 may control the vehicle based on filtering out the potential interaction between the vehicle and the instance. In this example, the vehicle safety component 102 may filter out the potential interaction based on the instance being substantially behind the vehicle 108. In some examples, the vehicle safety component 102 may proceed throughout the environment. For example, box 138 illustrates the vehicle 108 following a trajectory 140 throughout the environment. In this case, the vehicle 108 may be controlled by the vehicle safety component or a primary vehicle computing component. In such instances, the vehicle 108 may be instructed to proceed forward to reduce the likelihood of a collision.

Figure 2:
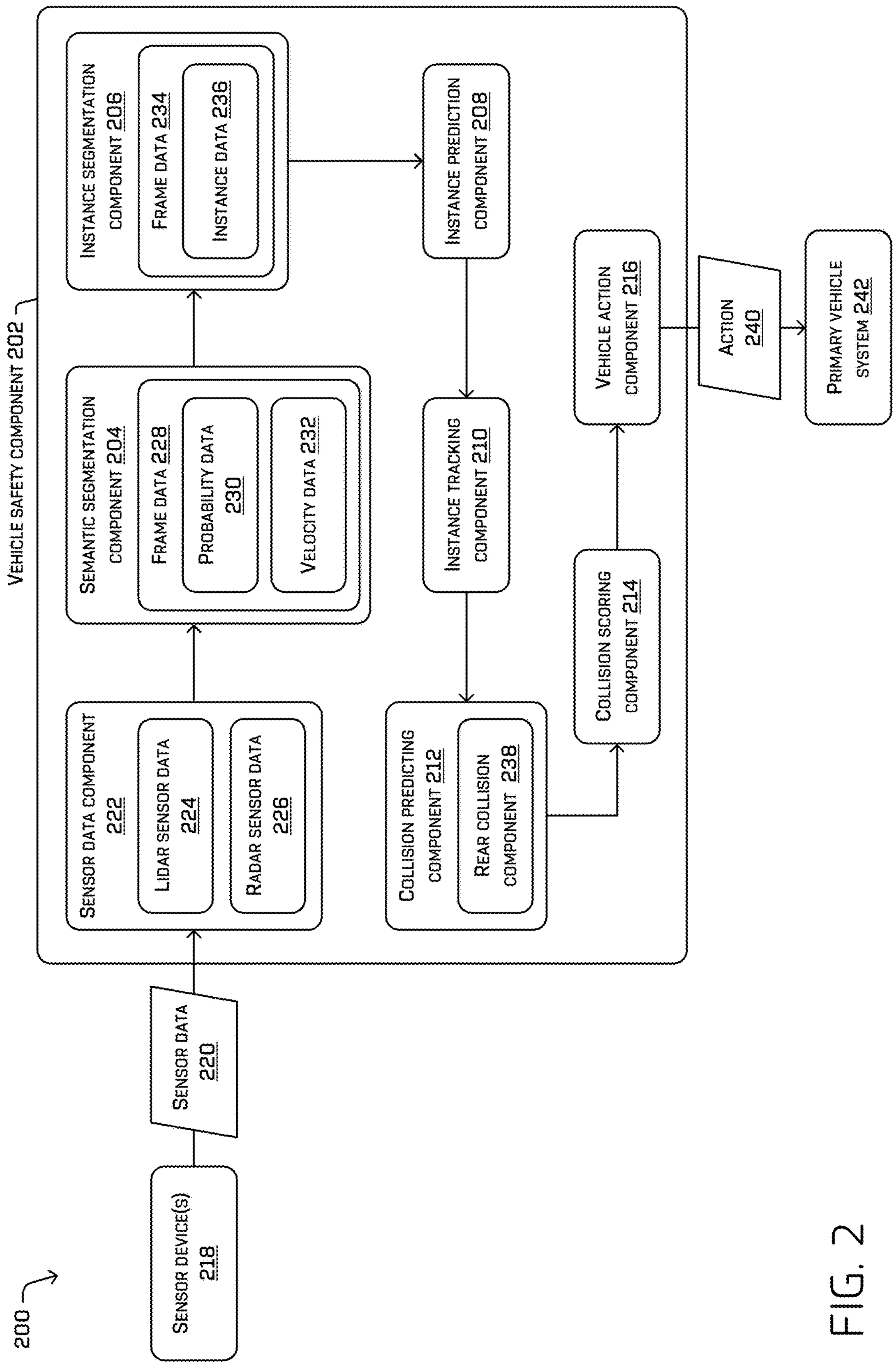
FIG. 2 illustrates an example computing system including a vehicle safety component configured to identify and/or filter out potential vehicle-object interactions based on the object being located behind the vehicle, in accordance with one or more examples of the disclosure.

FIG. 2 illustrates an example computing system 200 including a vehicle safety component 202 configured to identify and/or filter out potential vehicle-object interactions based on the object being located behind the vehicle.

In some examples, the vehicle safety component 202 may be similar or identical to the vehicle safety component described above, or in other examples herein. As noted above, in some cases the vehicle safety component 202 may be implemented within or otherwise associated with a perception component, a prediction component, a planning component, and/or a secondary component of an autonomous vehicle. In some examples, the vehicle safety component 202 may be caused to perform operations related to potential collision filtering. That is, the vehicle safety component 202 may include various components, described below, configured to perform different functionalities of a potential collision filtering technique. In some examples, some or all of the subcomponents of the vehicle safety component 202 may be integrated in a remote server-based system while other subcomponents may be integrated in on-vehicle systems. In some examples, the vehicle safety component 202 may include a semantic segmentation component 204 configured to generate one or more semantic segmentation maps, an instance segmentation component 206 configured to generate one or more instance segmentation maps, an instance prediction component 208 configured to generate one or more instance prediction maps, an instance tracking component 210 configured to generate one or more instance tracking maps, a collision predicting component 212 configured to identify potential collisions and/or filter out potential collisions in which the object is located behind the vehicle, a collision scoring component 214 configured to generate one or more object-vehicle interaction scores, and/or a vehicle action component 216 configured to determine one or more actions for the vehicle to follow throughout the environment.

In some examples, the vehicle safety component 202 may receive sensor data from one or more sensor device(s) within (or otherwise associated with) an autonomous vehicle. Different sensor devices 218 may be mounted or installed at different locations on the vehicle, and may include various types of sensor devices (e.g., lidar device(s), radar device(s), time-of-flight device(s), image capturing device(s), etc.) providing various elements (or parameters) to the vehicle safety component 202. In some examples, such parameters may include azimuth data, elevation data, distance (or range) data, intensity data, angular data, doppler data, velocity data, and/or any other type of data. For example, the vehicle safety component 202 may receive sensor data 220 from one or more sensor device(s) 218. The sensor device(s) 218 may be mounted or installed at different locations on and/or in the autonomous vehicle. As shown in FIG. 2, the sensor data 220 may be provided to the vehicle safety component 202. In some examples, the vehicle safety component 202 may include a sensor data component 222 configured to receive, store, and/or synchronize received sensor data 220 form the sensor device(s) 218. The sensor data component 222 may include various subcomponents, described below, to receive, store, synchronize, and/or analyze the sensor data 220. In this example, the sensor data component 222 may include a lidar sensor data component 224 and a radar sensor data component 226; however, in other examples, the sensor data component 222 may include more or fewer components which may include additional or fewer types of sensor devices. In such instances the lidar sensor data component 224 may receive, store, synchronize, and/or analyze sensor data 220 that is associated with lidar data. The radar sensor data component 226 may receive, store, synchronize, and/or analyze the sensor data 220 that is associated with radar data.

In some examples, the vehicle safety component 202 may include a semantic segmentation component 204 configured to generate one or more semantic segmentation maps. The semantic segmentation component 204 may receive sensor data 220 from the sensor data component 222. In some examples, the semantic segmentation component 204 may evaluate the sensor data 220 to generate one or more semantic segmentation maps. Such semantic segmentation map(s) may represent the environment at a future time (e.g., 0.5 seconds into the future, 1 second into the future, 2 seconds into the future, 10 seconds into the future, etc.). That is, the first semantic segmentation map may represent the environment at the current time (e.g., to), the second semantic segmentation map may represent the environment 0.5 seconds into the future (e.g., $t_{0.5}$), the third semantic segmentation map may represent the environment 1 second into the future (e.g., $t_1$), etc. Though it has been described that such semantic segmentation maps are at equidistant time intervals, in other examples, the semantic segmentation component 204 may determine such maps at varying time intervals.

In such instances, the semantic segmentation component 204 may include one or more subcomponents such as a frame data component 228. The frame data component 228 may generate and/or store data associated with the one or more semantic segmentation maps (or frames). As shown, the frame data component 228 may include one or more subcomponents such as a probability data component 230 and a velocity data component 232. In such instances, the probability data component 230 may include probability data that represents the likelihood and/or confidence that an object is at the pixel location at a specific time. Further, the velocity data component 232 may include velocity data corresponding to a predicted velocity of the object(s) associated with the pixel. That is, each pixel in the semantic segmentation map may include probability data and velocity data.

In some examples, the vehicle safety component 202 may include an instance segmentation component 206 configured to generate one or more instance segmentation maps. The instance segmentation component 206 may receive the semantic segmentation maps and/or the sensor data 220 from the semantic segmentation component 204. The instance segmentation component 206 may evaluate the semantic segmentation maps to generate one or more instance segmentation maps. That is, the instance segmentation component 206 may input the sensor data 220 and/or the semantic segmentation maps into a machine-learned model trained to output such instance segmentation maps. In such instances, the instance segmentation maps may identify one or more instances from the semantic segmentation maps. In such instances, each instance may be assigned (randomly or based on location) an instance identifier. Further, the instance segmentation component 206 may generate an instance segmentation map for each timestep from which there is a corresponding semantic segmentation map. However, this is not intended to be limiting; in other examples, the instance segmentation component 206 may generate more or fewer instance segmentation maps at the same or different time intervals as the semantic segmentation component 204 generates semantic segmentation maps.

In some examples the instance segmentation component 206 may include one or more subcomponents such as a frame data component 234 which may include an instance data component 236. The frame data component 234 may generate and/or store data associated with the one or more instance segmentation maps (or frames). The instance data component 236 may receive and/or store the data associated with each instance within each map. That is, the instance data component 236 may include identifier data, size data, shape data, location data, pose data, type data, velocity data, etc. for some or all instances in some or all maps. In such instances, the instance data component 236 may determine the velocity data based on determining an average velocity of some or all pixels corresponding to the instance (e.g., the pixels covering a similar location in the map as the instance).

Though FIG. 2 illustrates that the semantic segmentation component 204 and the instance segmentation component 206 are two distinct components performing different operations, in other examples such components may be a single component. That is, in other examples, the semantic segmentation component 204 and the instance segmentation component 206 may be a single component configured to output (or generate) one or more instance segmentation maps.

In some examples, the vehicle safety component 202 may include an instance prediction component 208 configured to generate one or more instance prediction maps. The instance prediction component 208 may receive the instance segmentation maps, the semantic segmentation maps, and/or the sensor data 220 from the instance segmentation component 206. In some examples, the instance prediction component 208 may evaluate the instance segmentation maps to generate one or more instance prediction maps. In such instances, the instance prediction component 208 may predict, for a specific instance segmentation map, where the instances stored therein may be located at a future time. The instance prediction component 208 may determine such instance prediction maps based on the velocity of the instance. Further, the instance prediction component 208 may use such velocity data to determine the distance the instance may move between a period of time (e.g., from 1 second into the future to 1.5 seconds into the future). That is, the instance prediction map at $t_{0.5}$ may be a prediction of the instance location(s) contained in the instance segmentation map at $t_0$, the instance prediction map at $t_1$ may be a prediction of the instance location(s) contained in the instance segmentation map at $t_0$, etc.

In some examples, the vehicle safety component 202 may include an instance tracking component 210 configured to generate one or more instance tracking maps. The instance tracking component 210 may receive the instance prediction maps, the instance segmentation maps, the semantic segmentation maps, and/or the sensor data 220 from the instance prediction component 208. The instance tracking component 210 may generate instance tracking map(s) that contain instance(s) with consistent instance identifiers between the instance tracking maps. Since the instance segmentation component 206 randomly assigns each instance an instance identifier, a single instance may have a first instance identifier in the instance prediction (or segmentation) map at $t_0$ (e.g., instance identifier is "vehicle 1") and a second instance identifier in the instance prediction (or segmentation) map at $t_{0.5}$ (or any other time frame) (e.g., instance identifier is "vehicle 2"). As such, the instance tracking component 210 may generate instance tracking maps that track the location(s) of an instance from one frame to another (e.g., an instance has the same instance identifier between all instance tracking maps). The instance tracking component 210 updates the instance identifiers based on the velocity data and/or instance location data. In such instances, the instance tracking component 210 may predict, for a specific instance tracking map, where an instance is likely to be located at a different time interval based on the instance velocity. Based on the predicted location, the instance tracking component 210 may identify the instance at the predicted location and update the instance identifier such that it is consistent across the different maps.

In some examples, the vehicle safety component 202 may include a collision predicting component 212 configured to identify potential collisions and/or filter out potential collisions in which the object is located behind the vehicle. The collision predicting component 212 may determine whether the vehicle may be predicted to interact or otherwise collide with an instance at a future time. That is, the collision predicting component 212 may determine whether any of the future states of the vehicle overlap (and/or are within a threshold of one another) physically and temporally with an instance. In such instances, the collision predicting component 212 may receive one or more candidate trajectories for the vehicle to follow. As noted above, the candidate trajectories may include multiple state. Each state may include data that describes the state of the vehicle (e.g., pose data, velocity, acceleration, steering angle, etc.) at a certain location and/or time. In such instances, the collision predicting component 212 may determine, for each instance tracking map (or any other map), whether a state of the vehicle physically overlaps with an instance. That is, for the instance tracking map at $t_0$, the collision predicting component 212 may identify the state of the vehicle at $t_0$ and determine whether the vehicle overlaps physically with an instance within the instance tracking map at $t_0$. Further, at $t_1$, the collision predicting component 212 may identify the state of the vehicle at $t_1$ and determine whether the state overlaps with any instances in the instance tracking map at $t_1$. If, in any of the instance tracking maps, the future state of the vehicle overlaps with an instance, the collision predicting component 212 may determine that there may be a potential collision.

In some examples, the collision predicting component 212 may include a rear collision component 238. In such instances, the rear collision component 238 may be configured to filter out potential collisions in which the instance is located behind the vehicle. As such, based on the collision predicting component 212 determining that there is a potential collision, the rear collision component 238 may identify the first (or earliest) instance tracking map within which the instance is present. Based on identifying the first map, the rear collision component 238 may determine, based on the first map within which the instance appears, whether the instance is substantially behind the vehicle.

In some examples, the rear collision component 238 may determine whether the instance is behind the vehicle based on determining a first angle between a first vector extending between the location of vehicle in the first instance tracking map and the location of the vehicle at the point of collision and a second vector extending between the location of the instance in the first instance tracking map and the location of the instance at the point of collision and a second angle between the first vector and a third vector extending between the location of the instance in the first instance tracking map and the location of the vehicle in the first instance tracking map. In such instances, the rear collision component 238 may compare the first angle to a first threshold and compare the second angle to a second threshold. If the first angle meets or exceeds the first threshold and the second angle meets or exceeds the second threshold, the rear collision component 238 may determine that the instance may be located substantially behind the vehicle and exclude the potential collision from further processing. Conversely, if the first angle is below the first threshold and the second angle is below the second threshold, the rear collision component 238 may determine that the instance is not located behind the vehicle and may include the potential collision in further processing.

In some examples, the vehicle safety component 202 may include a collision scoring component 214 configured to generate one or more object-vehicle interaction scores. The collision scoring component 214 may determine a first score associated with danger of the potential collision if the vehicle reduces velocity and a second score associated with the danger of the potential collision if the vehicle maintains a similar velocity. The collision scoring component 214 may determine such scores based on a location of the potential collision in the environment, a location of the potential collision to the vehicle, a location of the occupant(s) within the vehicle, a relative velocity between the vehicle and the instance, a relative pose between the vehicle and the instance, and/or any other factor.

In some examples, the vehicle safety component 202 may include a vehicle action component 216 configured to determine one or more actions for the vehicle to follow throughout the environment. In some examples, the vehicle action component 216 may compare the first score with the second score and instruct the vehicle to follow the action of the lowest score. That is, if the first score is lower than the second score, the vehicle action component 216 may instruct the vehicle to reduce vehicle velocity. If the second score is lower than the first score, the vehicle action component 216 may instruct the vehicle to maintain the current velocity of the vehicle. In such instances, the vehicle action component 216 may send the action 240 to a primary vehicle system 242 for further processing. In such instances, the primary vehicle system 242 may control the vehicle based at least in part on evaluating the action 240.

Figure 3:
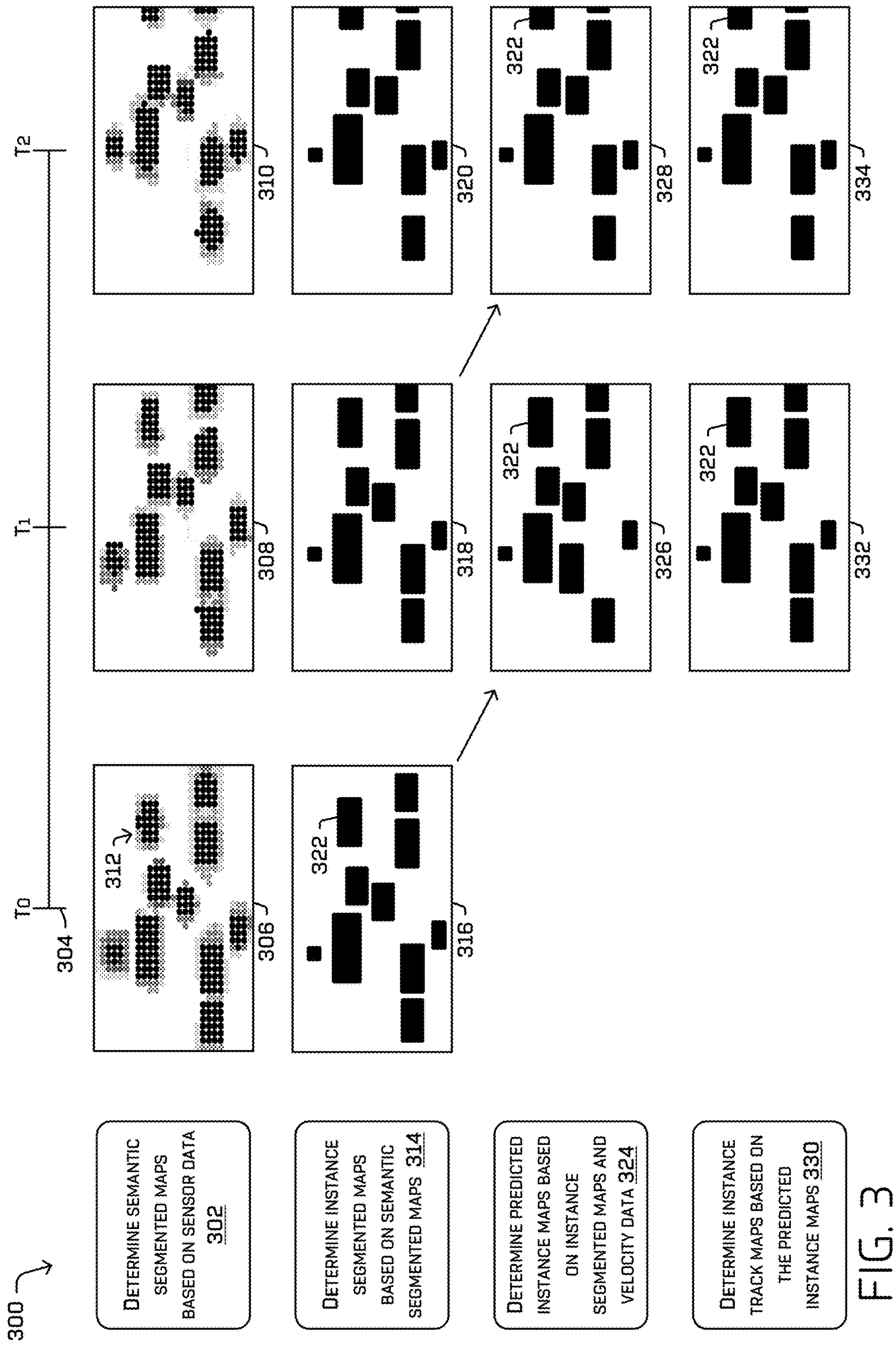
FIG. 3 is a pictorial flow diagram illustrating an example technique for determining semantic segmented maps, determining segmented instance maps based on the semantic segmented maps, determining predicted instance maps based on the segmented instance maps and velocity data, and determining an instance track map based on the predicted instance maps, in accordance with one or more examples of the disclosure.

FIG. 3 is a pictorial flow diagram illustrating an example process 300 for determining semantic segmented maps, determining segmented instance maps based on the semantic segmented maps, determining predicted instance maps based on the segmented instance maps and velocity data, and determining an instance track map based on the predicted instance maps. As describe above, some or all of the operations in the example process 300 may be performed by a vehicle safety component that is similar or identical to the vehicle safety component 202 as described throughout.

At operation 302, the vehicle safety component may determine semantic segmentation maps based on sensor data. In some examples, the vehicle safety component may receive sensor data from one or more sensor devices mounted or installed on a vehicle moving throughout an environment. In such instances, the vehicle safety component may evaluate the sensor data to determine an action for the vehicle to follow in the environment. That is, in some examples, the vehicle safety component may determine semantic segmentation maps at various different times into the future. For example, the process 300 shows multiple semantic segmentation maps at different times in the future. In this example, FIG. 3 may include a timeline 304 that is discretized into various different timesteps. As shown, the timeline 304 may start at “0” and end at “2;” however, in other examples, the timeline 304 may start or stop at different timesteps. As shown, the timeline 304 may include one or more markings at $t_0$, $t_1$, and $t_2$. In some examples, the semantic segmentation maps may represent the predicted environment at such timesteps.

In this example, FIG. 3 may include multiple semantic segmentation maps. As shown, FIG. 3 may include a semantic segmentation map 306, a semantic segmentation map 308, and a semantic segmentation map 310. As shown, the semantic segmentation map 306 may correspond to $t_0$, the semantic segmentation map 308 may correspond to $t_1$ (e.g., 1 second into the future), and the semantic segmentation map 310 may correspond to $t_2$ (e.g., 2 seconds into the future). In such instances, the semantic segmentation maps may include multiple pixels which may include various types of data. For example, the pixels may include confidence data, velocity data, and/or any other type of data. The confidence data may represent the confidence that an object is present at the pixel location within the physical environment. In such instances, the level of confidence may be illustrated in FIG. 3 by the shade of black. For instance, the semantic segmentation map 306 may include a set of pixels 312 that may include various pixels at different shades. As such, the vehicle safety component may assign a darker shade to pixels with higher confidence values and a lighter shade to pixels with lower confidence values.

At operation 314, the vehicle safety component may determine instance segmentation maps based on the semantic segmentation maps determined at operation 302. In some examples, the vehicle safety component may input the semantic segmentation maps into a machine-learned model trained to output instance segmentation maps. Alternatively or additionally, the vehicle safety component may generate instance segmentation maps based on one or more clustering and/or heuristic-based techniques. For example, such instance segmentation maps may be determined by inputting the semantic segmentation maps into a clustering algorithm (e.g., k-means, k-medians, hierarchical clustering, etc.), DBSCAN (e.g., density-based spatial clustering of applications with noise), HDBSCAN, and/or any other type of heuristic-based techniques. For examples, FIG. 3 may include multiple different instance segmentation maps. FIG. 3 may include an instance segmentation map 316, an instance segmentation map 318, and an instance segmentation map 320. The instance segmentation map 316 may correspond to $t_0$, the instance segmentation map 318 may correspond to the predicted environment at $t_1$, and the instance segmentation map 320 may correspond to the predicted environment at $t_2$.

In some examples, the instance segmentation maps may correspond to the semantic segmentation maps. That is, the instance segmentation map 316 may correspond to the semantic segmentation map 306, the instance segmentation map 318 may correspond to the semantic segmentation map 308, and the instance segmentation map 320 may correspond to the semantic segmentation map 310. In such examples, the instance segmentation map 316 may include multiple instances that may be determined based on the plurality of pixels (and the data associated thereto) from the semantic segmentation map 306. For example, the instance segmentation map 316 may include an instance 322 that may correspond to the set of pixels 312 in the semantic segmentation map 306.

At operation 324, the vehicle safety component may determine predicted instance maps based on the instance segmentation maps (e.g., determined at operation 314) and the instance velocity data. The vehicle safety component may determine the instance prediction maps based on determining the location of instances at future times based on the velocity of such instances. For example, FIG. 3 includes an instance prediction map 326 and an instance prediction map 328. In such instances, the instance prediction map 326 may be a representation of the predicted instance locations based on applying the velocity data to the instances in the instance segmentation map 316. Further, the instance prediction map 328 may be a representation of the predicted instance locations based on applying the velocity data to the instances in the instance segmentation map 318. As shown in this example, the instance 322 may be located at a different position in the instance prediction map 326 as compared to the location of the instance 322 in the instance segmentation map 316. The vehicle safety component may determine the predicted location based on the velocity of the instance 322.

At operation 330, the vehicle safety component may determine instance track maps based on the instance prediction maps. The vehicle safety component may determine the instance track maps may based on evaluating the instances of the instance prediction maps. That is, the instance track maps may ensure that a single instance has the same instance identifier across all instance tracking maps. As shown in this example, FIG. 3 may include an instance tracking map 332 and an instance tracking map 334. In this example, the vehicle safety component may ensure that the instance 322 in the instance tracking map 332 has the same instance identifier as the instance 322 in the instance tracking map 334. For example, based on the vehicle safety component randomly assigning instance identifiers to instances at operation 314, a single instance may have different instance identifiers. For instance, the instance 322 in the instance prediction map 326 may have an instance identifier of "vehicle 1" and the instance 322 in the instance prediction map 328 may have an instance identifier of "vehicle 2." Such inaccuracies may lead to inaccurate results when determining whether an instance is located behind the vehicle at a previous instance map. As such, the vehicle safety component may determine, based at least in part on the instance 322 velocity data, that the instance 322 in the instance tracking map 332 and the instance 322 in the instance tracking map 334 are the same instance. Accordingly, the vehicle safety component may assign such instances the same instance identifier.

Figure 4:
FIG. 4 illustrates an example environment including a vehicle interacting with an instance associated with an object in the example environment, in accordance with one or more examples of the disclosure.

FIG. 4 illustrates an example environment 400 including a vehicle 404 interacting with an instance 410 associated with an object in the example environment. Specifically, FIG. 4 may illustrate the operations performed by the vehicle safety component to determine whether the vehicle may collide with an object at a future time.

In some examples, the example environment 400 may be similar or identical to the environment of FIGS. 1 and 3. As described above, the example environment 400 may include an instance tracking map 402. In this example, the instance tracking map 402 may be a representation of the predicted locations and/or poses of the instances in the example environment 400. That is, the instance tracking map 402 may represent the environment at 0.5 seconds into the future, 1 second into the future, 1.5 seconds into the future, 2 seconds into the future, 5 seconds into the future, or any other amount of time into the future. For this example, the instance tracking map 402 may be a representation of the environment at 2 seconds into the future (e.g., $t_2$).

In some examples, the instance tracking map 402 may include a vehicle 404. In some examples, the vehicle 404 may include a trajectory 406 that instructs the vehicle 404 through the environment. In this example, the trajectory 406 may instruct the vehicle 404 to navigate straight and perform a lane changing operation. In some examples, the trajectory 406 may include a plurality of states which may represent the state of the vehicle at a particular moment in time. As shown, the trajectory 406 may include a vehicle state 408 that represents the location and/or orientation of the vehicle 404 at the $t_2$ (e.g., 2 seconds into the future). That is, the location of the vehicle 404 may be a current location and/or orientation of the vehicle 404 (e.g., $t_0$). Further, the location of the vehicle state 408 may be the location and/or orientation of the vehicle 404 at $t_2$ (e.g., 2 seconds into the future).

In some examples, the vehicle safety component may evaluate the vehicle state 408 to determine whether the vehicle 404 may be involved in a potential collision. The vehicle safety component may determine that there is a potential collision based on the vehicle state 408 overlapping physically and temporally with any of the instances. In this example, the vehicle state 408 may be the location of the vehicle 404 at the same future time as is represented in the instance tracking map 402. As such, if the vehicle state 408 overlaps physically with any of the instances, the vehicle safety component may determine that there is a temporal overlap as well. As shown, in this example, the vehicle state 408 may overlap physically with the instance 410. As such, based on the vehicle state 408 overlapping with the instance temporally and physically, the vehicle safety component may determine that there is a potential collision. In such instances, the vehicle safety component may determine whether to filter out the potential collision based on the location of the instance 410 relative to the vehicle state 408 at a previous instance tracking map. Additional description regarding the filtering of potential collisions is discussed with respect to FIGS. 2 and 5.

Figure 5:
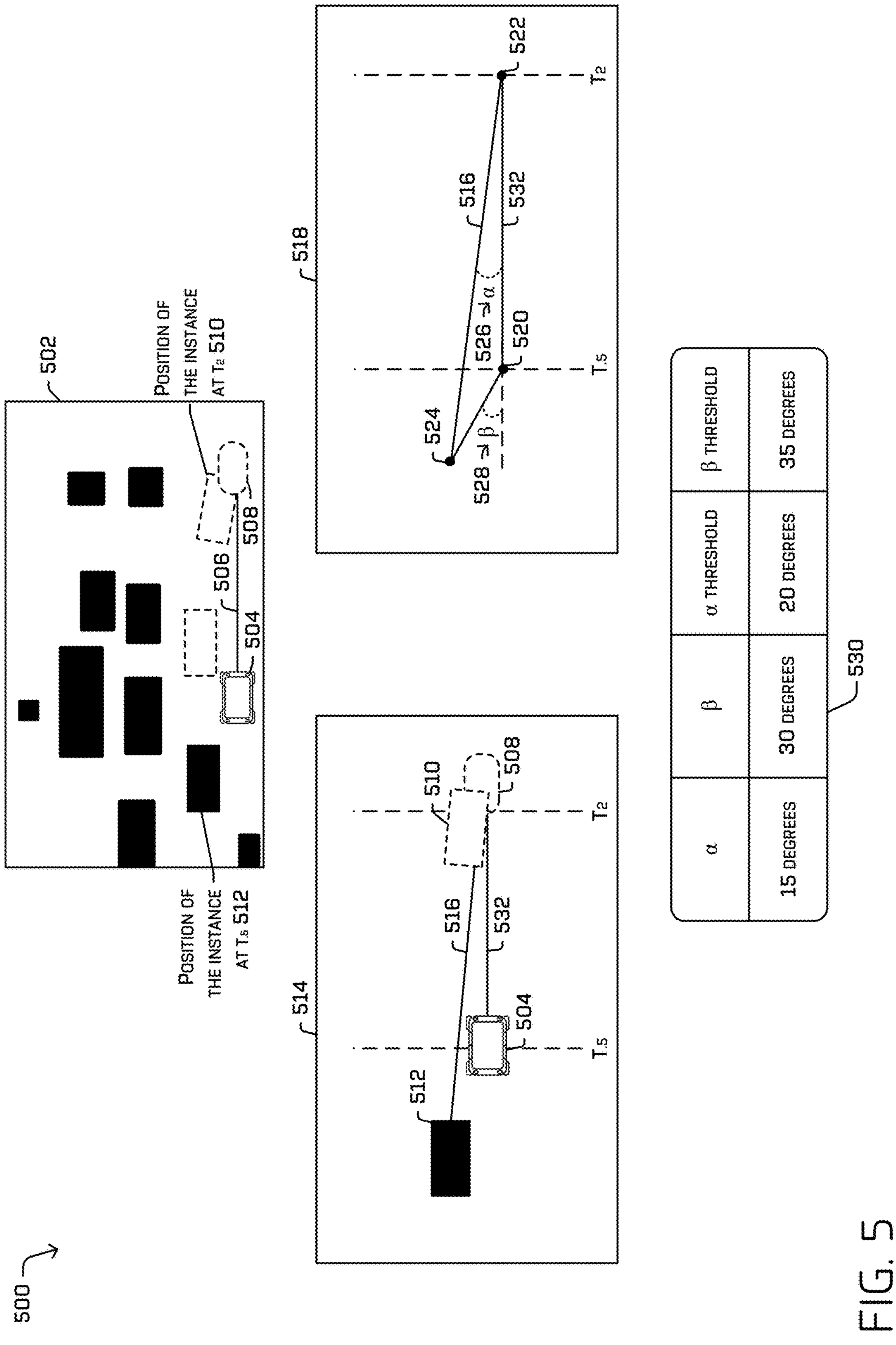
FIG. 5 illustrates an example representation for determining whether an instance is located substantially behind the vehicle, in accordance with one or more examples of the disclosure.

FIG. 5 illustrates an example representation 500 for determining whether an instance is located substantially behind the vehicle.

In this example, the example representation 500 may include an instance tracking map 502. As shown, the instance tracking map 502 may include multiple instances (e.g., black rectangles) that may correspond to an object in the 3D environment. The instance tracking map 502 may be a representation of the environment at $t_{0.5}$ (e.g., 0.5 seconds into the future). That is, the instance locations may be a predicted location based on sensor data, instance data, etc.

In this example, the instance tracking map 502 may include a vehicle 504. In such instances, the vehicle 504 may be following a trajectory 506. The trajectory 506 may include a state 508 that represents the state of the vehicle 504 at a specific moment in time. In this example, the state 508 may be a representation of the location, pose, acceleration, velocity, etc. of the vehicle 504 at time $t_2$ (e.g., 2 seconds into the future). The location of the vehicle 504 may be a position at time $t_{0.5}$ (e.g., 0.5 seconds into the future). In this example, the instance tracking map 502 may include an instance 510. As shown, the instance 510 may be a dashed rectangle. The instance 510 may be the position of the instance 510 at time $t_2$ (e.g., 2 seconds into the future). The instance tracking map 502 may also include the same instance 512 at $t_{0.5}$.

In this example, the vehicle safety component may determine whether the vehicle 504 is predicted to interact with any of the instances within the instance tracking map 502. As such, the vehicle safety component may determine the state 508 (e.g., represents the location and/or pose of the vehicle at $t_2$) and determine that the state 508 overlaps physically with the instance 510. As such, the vehicle safety component may evaluate the potential collision to determine if the instance 510 is located behind the vehicle 504 in a previous instance tracking map. In this example, the instance tracking map 502 may be the earliest instance tracking map in which the instance 512 (or 510) is present.

Based on determining that there is a potential collision, the vehicle safety component may determine or otherwise evaluate the relationships between the instance, the vehicle, and the state at the different timesteps. As shown in FIG. 5, the example representation 500 may include a box 514 that illustrates the locations of the instances, vehicle, and/or state of the vehicle. That is, the box 514 includes the vehicle 504 and the instance 512 at time $t_{0.5}$. Further, the box 514 may include the instance at time $t_2$ 510 as well as the state 508 of the vehicle at time $t_2$. In some examples, the box 514 may also include a vector 516 which may represent the absolute displacement between the instance 512 and the instance 510. The vehicle safety component may determine the vector 516 based on determining a track of the instance 512 between the various instance tracking maps. In some examples, the box 514 may also include a vector 532 which may represent the absolute displacement between the vehicle 504 and the state 508.

In this example, FIG. 5 may include a box 518 which may include a plurality of angles which may correspond to the angles present in box 514. Further, the angles may be analyzed to determine whether the instance 512 is substantially behind the vehicle 504. As described above, the vehicle safety component may determine a first angle 526 based on the angle between the vector 516 and the vector 532. As shown, the box 518 may include a point 522 which may represent the location of the potential collision. Further, the vehicle safety component may determine a second angle 528 based on the angle between the vector 532 and the vector between the point 524 and the point 520. In such instances, the vehicle safety component may evaluate the first and second angles to determine whether the instance 512 is sufficiently behind the vehicle 504.

In this example, FIG. 5 may include a comparison table 530 which may include the first and second angle data as well as multiple angle thresholds. That is, if the first and/or second angles are below the first and/or second thresholds, the vehicle safety component may determine that the instance 512 is substantially behind the vehicle 504. Conversely, if the first and/or second angles meet or exceed the first and/or second thresholds, the vehicle safety component may determine that the instance is not substantially behind the vehicle. In this example, the comparison table 530 may indicate that the first angle 526 may be 15 degrees, the second angle 528 may be 30 degrees, the alpha (or first angle 526) threshold may be 20 degrees, and the beta (or second angle 528) threshold may be 35 degrees. In this example, the vehicle safety component may determine that the instance 512 is substantially behind the vehicle 504 based on the first angle 526 (e.g., 15 degrees) being less than the alpha threshold (e.g., 20 degrees) and the second angle 528 (e.g., 30 degrees) being less than the beta threshold (e.g., 35 degrees).

Figure 6:
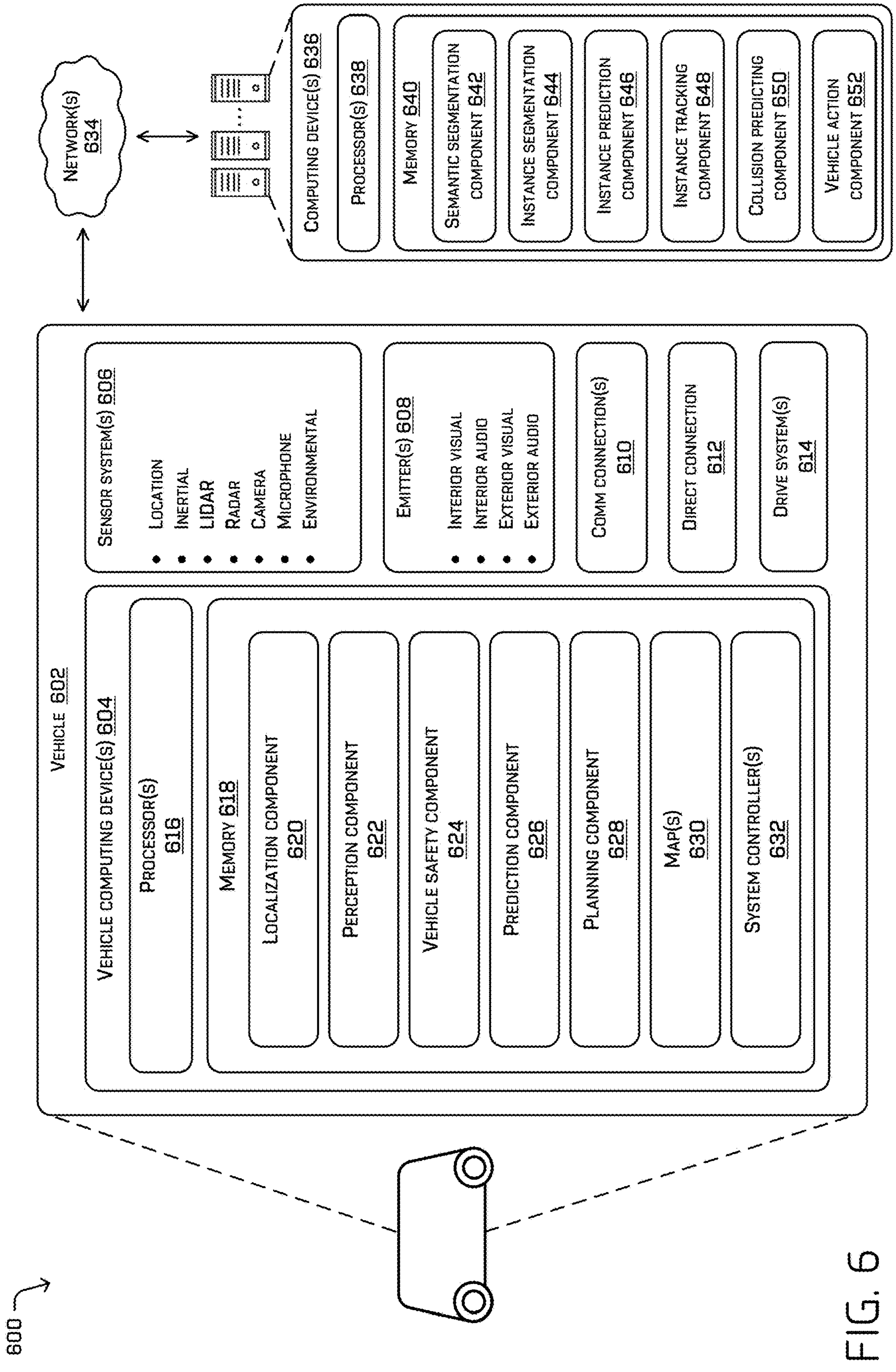
FIG. 6 depicts a block diagram of an example system for implementing various techniques described herein.

FIG. 6 is a block diagram of an example system 600 for implementing the techniques described herein. In at least one example, the system 600 may include a vehicle, such as vehicle 602. The vehicle 602 may include one or more vehicle computing devices 604, one or more sensor systems 606, one or more emitters 608, one or more communication connections 610, at least one direct connection 612, and one or more drive systems 614.

The vehicle computing device 604 may include one or more processors 616 and memory 618 communicatively coupled with the processor(s) 616. In the illustrated example, the vehicle 602 is an autonomous vehicle; however, the vehicle 602 could be any other type of vehicle, such as a semi-autonomous vehicle, or any other system having at least an image capture device (e.g., a camera-enabled smartphone). In some instances, the autonomous vehicle 602 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 602 may be a fully or partially autonomous vehicle having any other level or classification.

In the illustrated example, the memory 618 of the vehicle computing device 604 stores a localization component 620, a perception component 622 including a vehicle safety component 624, a prediction component 626, a planner component 628, one or more system controllers 632, and one or more maps 630 (or map data). Though depicted in FIG. 6 as residing in the memory 618 for illustrative purposes, it is contemplated that the localization component 620, the perception component 622 including the vehicle safety component 624, the prediction component 626, the planner component 628, system controller(s) 632, and/or the map(s) may additionally, or alternatively, be accessible to the vehicle 602 (e.g., stored on, or otherwise accessible by, memory remote from the vehicle 602, such as, for example, on memory 640 of one or more computing device 636 (e.g., a remote computing device)). In some examples, the memory 640 may include a semantic segmentation component 642, an instance segmentation component 644, an instance prediction component 646, an instance tracking component 648, a collision predicting component 650, and/or a vehicle action component 652.

In at least one example, the localization component 620 may include functionality to receive sensor data from the sensor system(s) 606 to determine a position and/or orientation of the vehicle 602 (e.g., one or more of an x-, y-, z-position, roll, pitch, or yaw). For example, the localization component 620 may include and/or request/receive a map of an environment, such as from map(s) 630, and may continuously determine a location and/or orientation of the vehicle 602 within the environment. In some instances, the localization component 620 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 602. In some instances, the localization component 620 may provide data to various components of the vehicle 602 to determine an initial position of the vehicle 602 for determining the relevance of an object to the vehicle 602, as discussed herein.

In some instances, the perception component 622 may include functionality to perform object detection, segmentation, and/or classification. In some examples, the perception component 622 may provide processed sensor data that indicates a presence of an object (e.g., entity) that is proximate to the vehicle 602 and/or a classification of the object as an object type (e.g., car, pedestrian, cyclist, animal, building, tree, road surface, curb, sidewalk, unknown, etc.). In some examples, the perception component 622 may provide processed sensor data that indicates a presence of a stationary entity that is proximate to the vehicle 602 and/or a classification of the stationary entity as a type (e.g., building, tree, road surface, curb, sidewalk, unknown, etc.). In additional or alternative examples, the perception component 622 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 626 may generate one or more probability maps representing prediction probabilities of possible locations of one or more objects in an environment. For example, the prediction component 626 may generate one or more probability maps for vehicles, pedestrians, animals, and the like within a threshold distance from the vehicle 602. In some instances, the prediction component 626 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 626 may generate predicted trajectories of objects (e.g., objects) in an environment. For example, the prediction component 626 may generate one or more predicted trajectories for objects within a threshold distance from the vehicle 602. In some examples, the prediction component 626 may measure a trace of an object and generate a trajectory for the object based on observed and predicted behavior.

In general, the planner component 628 may determine a path for the vehicle 602 to follow to traverse through an environment. For example, the planner component 628 may determine various routes and trajectories and various levels of detail. For example, the planner component 628 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 628 may generate an instruction for guiding the vehicle 602 along at least a portion of the route from the first location to the second location. In at least one example, the planner component 628 may determine how to guide the vehicle 602 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 628 may select a trajectory for the vehicle 602.

In other examples, the planner component 628 may alternatively, or additionally, use data from the localization component 620, the perception component 622, and/or the prediction component 626 to determine a path for the vehicle 602 to follow to traverse through an environment. For example, the planner component 628 may receive data (e.g., object data) from the localization component 620, the perception component 622, and/or the prediction component 626 regarding objects associated with an environment. In some examples, the planner component 628 receives data for relevant objects within the environment. Using this data, the planner component 628 may determine a route to travel from a first location (e.g., a current location) to a second location (e.g., a target location) to avoid objects in an environment. In at least some examples, such a planner component 628 may determine there is no such collision-free path and, in turn, provide a path that brings vehicle 602 to a safe stop avoiding all collisions and/or otherwise mitigating damage.

The vehicle safety component 624 may perform any of the techniques described with respect to any of FIGS. 1-5 above with respect to filtering candidate collisions with objects in an environment.

In at least one example, the vehicle computing device 604 may include one or more system controllers 632, which may be configured to control steering, propulsion, braking, safety, emitters, communication, and other systems of the vehicle 602. The system controller(s) 632 may communicate with and/or control corresponding systems of the drive system(s) 614 and/or other components of the vehicle 602.

The memory 618 may further include one or more maps 630 that may be used by the vehicle 602 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 602 may be controlled based at least in part on the map(s) 630. That is, the map(s) 630 may be used in connection with the localization component 620, the perception component 622, the prediction component 626, and/or the planner component 628 to determine a location of the vehicle 602, detect objects in an environment, generate routes, determine actions and/or trajectories to navigate within an environment.

In some examples, the one or more maps 630 may be stored on a remote computing device(s) (such as the computing device(s) 636) accessible via network(s) 634. In some examples, multiple maps 630 may be stored based on, for example, a characteristic (e.g., type of entity, time of day, day of week, season of the year, etc.). Storing multiple maps 630 may have similar memory requirements, but increase the speed at which data in a map may be accessed.

In some instances, aspects of some or all of the components discussed herein may include any models, techniques, and/or machine-learned techniques. For example, in some instances, the components in the memory 618 (and the memory 640, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEiT), visual bidirectional encoder from transformers (VisualBERT), image generative pretrained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

In at least one example, the sensor system(s) 606 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 may include multiple instances of each of these or other types of sensors. For instance, the lidar sensors may include individual lidar sensors located at the corners, front, back, sides, and/or top of the vehicle 602. As another example, the camera sensors may include multiple cameras disposed at various locations about the exterior and/or interior of the vehicle 602. The sensor system(s) 606 may provide input to the vehicle computing device 604. Additionally, or in the alternative, the sensor system(s) 606 may send sensor data, via the one or more networks 634, to the one or more computing device(s) 636 at a particular frequency, after a lapse of a predetermined period of time, in near real-time, etc.

The vehicle 602 may also include one or more emitters 608 for emitting light and/or sound. The emitter(s) 608 may include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 may also include one or more communication connections 610 that enable communication between the vehicle 602 and one or more other local or remote computing device(s). For instance, the communication connection(s) 610 may facilitate communication with other local computing device(s) on the vehicle 602 and/or the drive system(s) 614. Also, the communication connection(s) 610 may allow the vehicle to communicate with other nearby computing device(s) (e.g., computing device 636, other nearby vehicles, etc.) and/or one or more remote sensor system(s) for receiving sensor data. The communications connection(s) 610 also enable the vehicle 602 to communicate with a remote teleoperations computing device or other remote services.

The communications connection(s) 610 may include physical and/or logical interfaces for connecting the vehicle computing device 604 to another computing device or a network, such as network(s) 634. For example, the communications connection(s) 610 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 may include one or more drive systems 614. In some examples, the vehicle 602 may have a single drive system 614. In at least one example, if the vehicle 602 has multiple drive systems 614, individual drive systems 614 may be positioned on opposite ends of the vehicle 602 (e.g., the front and the rear, etc.). In at least one example, the drive system(s) 614 may include one or more sensor systems to detect conditions of the drive system(s) 614 and/or the surroundings of the vehicle 602. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 614. In some cases, the sensor system(s) on the drive system(s) 614 may overlap or supplement corresponding systems of the vehicle 602 (e.g., sensor system(s) 606).

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 614. Furthermore, the drive system(s) 614 may also include one or more communication connection(s) that enable communication by the respective drive module with one or more other local or remote computing device(s).

In at least one example, the direct connection 612 may provide a physical interface to couple the one or more drive system(s) 614 with the body of the vehicle 602. For example, the direct connection 612 may allow the transfer of energy, fluids, air, data, etc. between the drive system(s) 614 and the vehicle. In some instances, the direct connection 612 may further releasably secure the drive system(s) 614 to the body of the vehicle 602.

In at least one example, the localization component 620, the perception component 622, the vehicle safety component 624, the prediction component 626, the planner component 628, the one or more system controllers 632, and the one or more maps 630 may process sensor data, as described above, and may send their respective outputs, over the one or more network(s) 634, to the computing device(s) 636. In at least one example, the localization component 620, the perception component 622, the vehicle safety component 624, the prediction component 626, the planner component 628, the one or more system controllers 632, and the one or more maps 630 may send their respective outputs to the computing device(s) 636 at a particular frequency, after a lapse of a predetermined period of time, in near real-time, etc.

In some examples, the vehicle 602 may send sensor data to the computing device(s) 636 via the network(s) 634. In some examples, the vehicle 602 may receive sensor data from the computing device(s) 636 and/or remote sensor system(s) via the network(s) 634. The sensor data may include raw sensor data and/or processed sensor data and/or representations of sensor data. In some examples, the sensor data (raw or processed) may be sent and/or received as one or more log files.

The computing device(s) 636 may include processor(s) 638 and a memory 640, which may include a semantic segmentation component 642, an instance segmentation component 644, an instance prediction component 646, an instance tracking component 648, a collision predicting component 650, and/or a vehicle action component 652. In some examples, the memory 640 may store one or more of components that are similar to the component(s) stored in the memory 618 of the vehicle 602. In such examples, the computing device(s) 636 may be configured to perform one or more of the processes described herein with respect to the vehicle 602. In some examples, the semantic segmentation component 642, the instance segmentation component 644, the instance prediction component 646, the instance tracking component 648, the collision predicting component 650, and/or the vehicle action component 652 may perform substantially similar functions as the vehicle safety component 624.

The processor(s) 616 of the vehicle 602 and the processor(s) 638 of the computing device(s) 636 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 618 and memory 640 are examples of non-transitory computer-readable media. The memory 618 and memory 640 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

Figure 7:
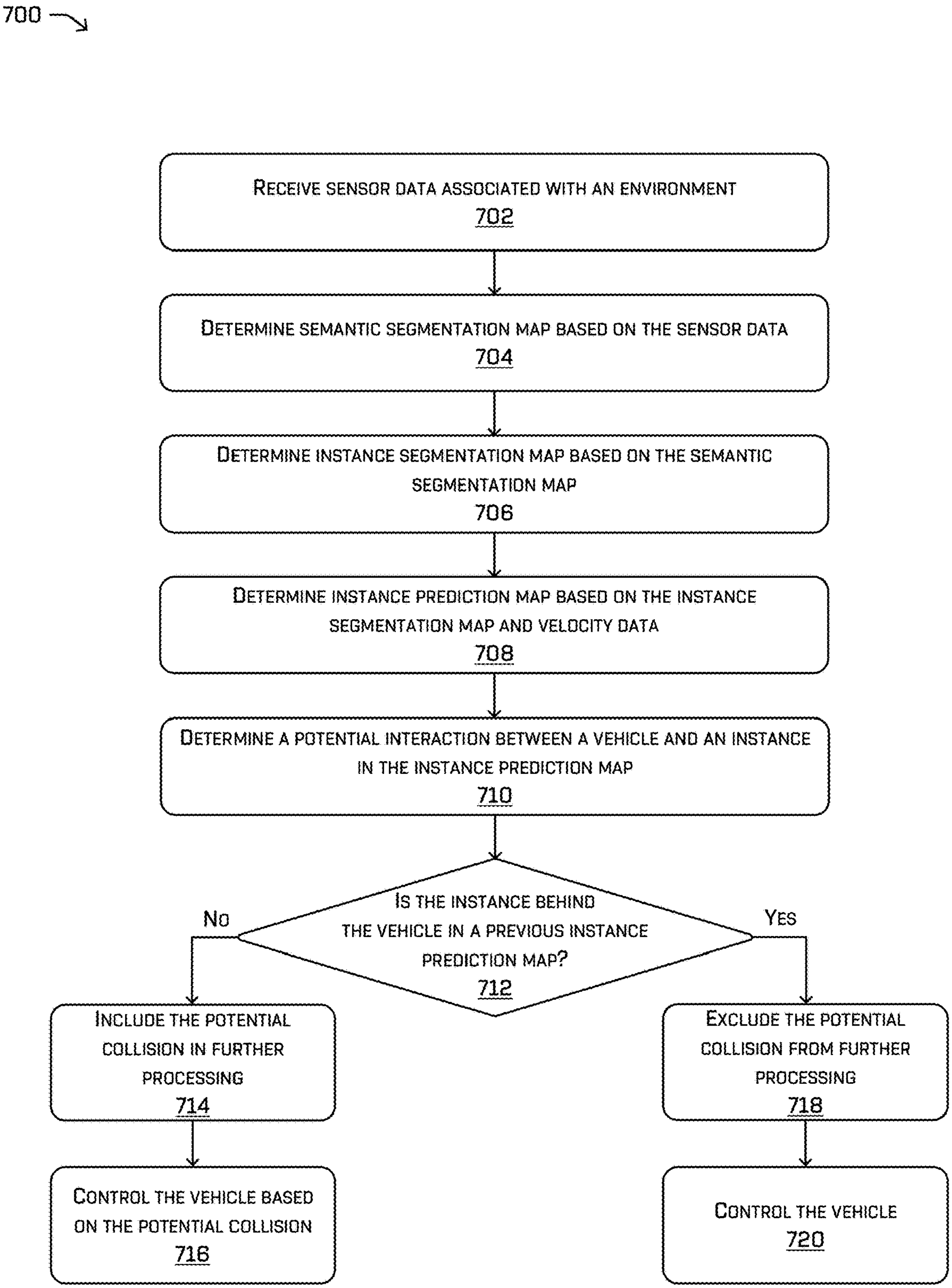
FIG. 7 is a flow diagram illustrating an example technique for receiving sensor data, determining semantic segmentation maps based on the sensor data, determining instance segmentation maps based on the semantic segmentation maps, determining instance prediction maps based on the instance segmentation maps, determining a potential collision based on the vehicle and an instance in the instance prediction maps, and controlling the vehicle based on the instance prediction maps, in accordance with one or more examples of the disclosure.

It should be noted that while FIG. 7 is illustrated as a distributed system, in alternative examples, components of the vehicle 602 may be associated with the computing device(s) 636 and/or components of the computing device(s) 636 may be associated with the vehicle 602. That is, the vehicle 602 may perform one or more of the functions associated with the computing device(s) 636, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

FIG. 7 is a flow diagram illustrating an example process 700 for receiving sensor data, determining semantic segmentation maps based on the sensor data, determining instance segmentation maps based on the semantic segmentation maps, determining instance prediction maps based on the instance segmentation maps, determining a potential collision based on the vehicle and an instance in the instance prediction maps, and controlling the vehicle based on the instance prediction maps. As described below, the example process 700 may be performed by one or more computer computer-based components configured to implement various functionalities described herein. For instance, process 700 may be performed by a vehicle safety component 202. As described above, the vehicle safety component 202 may be integrated as an on-vehicle system. However, in other examples, the vehicle safety component 202 may be integrated as a separate server-based system.

Process 700 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 702, the vehicle safety component may receive sensor data associated with an environment. In some examples, the vehicle may include multiple sensor devices (e.g., lidar device(s), radar device(s), time-of-flight device(s), image capturing device(s), etc.) configured to receive sensor data of the environment. Such sensor devices may be located at any location on or in the vehicle and may capture sensor data of any portion of the environment. In some examples, each sensor device may provide unique sensor data representative of the perspective of the sensor data.

At operation 704, the vehicle safety component may determine semantic segmentation maps based on the sensor data. A semantic segmentation map may be a map, image, graph, and/or frame that includes a plurality of pixels that are assigned with a specific class (e.g., vehicle, pedestrian, etc.). That is, the semantic segmentation map may be a 2D representation of the environment. Each pixel in the map may include data that corresponds to a location of the 3D physical environment. Further, the pixels may include confidence level data and/or velocity data. The confidence level data may represent the degree (or level) of confidence that there is an object at the pixel location at the specified time. The velocity data may represent the predicted velocity of the object corresponding to the pixel.

In some instances, the vehicle safety component may determine one or more semantic segmentation maps at various times in the future. That is, the vehicle safety component may determine multiple maps at different time intervals into the future. For example, the vehicle safety component may determine a first map at time $t_0$, a second map at time $t_{0.5}$ (e.g., 0.5 seconds into the future), a third map at time $t_1$ (e.g., 1 second into the future), a fourth map at time $t_{1.5}$ (e.g., 1.5 seconds into the future), and/or a fifth map at time $t_2$ (e.g., 2 seconds into the future). However, this is not intended to be limiting; in other examples, the vehicle safety component may determine more or less maps at different intervals and/or extending beyond 2 seconds into the future. The vehicle safety component may determine the semantic segmented maps based on providing the sensor data as input to a machine-learned model trained to output such semantic segmented maps. Example techniques for generating a semantic segmentation maps can be found, for example, in U.S. Pat. No. 10,535,138, issued Jan. 14, 2020, and titled "Sensor Data Segmentation," the content of which is herein incorporated by reference in its entirety and for all purposes.

At operation 706, the vehicle safety component may determine instance segmentation maps based on the semantic segmentation map. An instance segmentation map may be a map, image, graph, and/or frame that includes identified instances (e.g., blob or group of pixels) that are assigned with a specific class (e.g., vehicle, pedestrian, etc.). In such instances, each instance in the map may include a unique instance identifier (e.g., first vehicle, second vehicle, etc.). The instance segmentation map may be a 2D representation of the environment. Each instance in the instance segmentation map include data that corresponds to an object in the 3D physical environment. That is, an instance may include data such as size data, shape data, type data, location data, pose data, etc. The vehicle safety component may determine the instance segmented maps based on providing the semantic segmented maps and/or sensor data as input to a machine-learned model trained to output such instance segmented maps. That is, the vehicle safety component may receive a first map at time to, a second map at time $t_{0.5}$ (e.g., 0.5 seconds into the future), a third map at time $t_1$ (e.g., 1 second into the future), a fourth map at time $t_{1.5}$ (e.g., 1.5 seconds into the future), and/or a fifth map at time $t_2$ (e.g., 2 seconds into the future). In such instances, the first map at $t_0$ may correspond to the first semantic segmentation map at $t_0$, the second map at $t_{0.5}$ may correspond to the second segmentation map at $t_{0.5}$, etc. Example techniques for generating an instance segmentation map can be found, for example, in U.S. Pat. No. 10,535,138, issued Jan. 14, 2020, and titled "Sensor Data Segmentation," the content of which is herein incorporated by reference in its entirety and for all purposes.

Though it has been described that operations 704 and 706 are performed independent of each other, in some examples, the process 700 may include performing operations 704 and 706 as a single operation which may be configured to generate an instance segmentation map based on the sensor data.

At operation 708, the vehicle safety component may determine the instance prediction map based on the instance segmentation map and instance velocity data. An instance prediction map may be a map, image, graph, and/or frame that includes the predicted location of the one or more instances at a specific moment in time. For instance, the vehicle safety component may determine an instance prediction map that predicts, based on the instance segmentation map at $t_1$, where the instances may be located at $t_{1.5}$. The vehicle safety component may determine the instance prediction maps based on the instance segmentation maps and the instance velocity data. Specifically, the vehicle safety component may predict the future locations of the instance(s) based on the predicted velocity of such instances. The vehicle safety component may determine the velocity data of the instance based on the velocity data of the pixels corresponding to the instance. That is, each instance may include pixel identifier data that identifies which pixels of the semantic segmentation map correspond to which instance in the instance segmentation map. Further, as described above, each pixel in the semantic segmentation map may include a predicted velocity of the data stored at the pixel location. As such, the vehicle safety component may determine the instance velocity based on determining an average velocity of the pixels corresponding to the instance.

At operation 710, the vehicle safety component may determine a potential interaction between a vehicle and an instance in the instance prediction map. A potential interaction or collision may be an interaction between the vehicle and an instance in which the positions of such entities physically and temporally overlap. In some examples, the vehicle safety component may receive a candidate trajectory for the vehicle to follow through the environment. The candidate trajectory may include state data that describes the pose, velocity, acceleration, steering angle, etc. of the vehicle at a specific moment in time. As such, the vehicle safety component may determine that there is a potential collision based on one of the future trajectory states overlapping with an instance. That is, the vehicle safety component may identify the candidate trajectory state at $t_0$ and determine whether the state overlaps physically with one or more of the instances in the instance prediction map at $t_0$, identify the candidate trajectory state at $t_{0.5}$ and determine whether the state overlaps physically with one or more of the instances in the instance prediction map at $t_{0.5}$, identify the candidate trajectory state at $t_1$ and determine whether the state overlaps physically with one or more of the instances in the instance prediction map at $t_1$, etc. If the vehicle safety component determines that a state of the candidate trajectory overlaps with one of the instances in one of the instance tracking maps, the vehicle safety component may determine that there is a potential collision.

At operation 712, the vehicle safety component may determine whether instance is located behind the vehicle is a previous instance prediction map (or any other type of map). In some examples, the vehicle safety component may determine whether an instance is substantially behind the vehicle based on evaluating one or more angles associated with the vehicle and the instance across multiple instance prediction maps (or any other type of segmentation map). That is, the vehicle safety component may determine a first angle based on an absolute displacement of the vehicle across multiple maps and an absolute displacement between the vehicle across multiple maps. That is, the vehicle safety component may determine a first absolute displacement between the location of the vehicle in the first instance tracking map (e.g., the first instance tracking map in which the instance is present) and the location of the vehicle at the potential collision. The first absolute displacement may be represented by a (first) line (or directed vector) between the vehicle location in the first instance tracking frame and the vehicle location in the potential collision frame. Additionally, the vehicle safety component may determine a second absolute displacement between the location of the instance in the first tracking map and the location of the instance at the potential collision. The second absolute displacement may be represented by a (second) line (or directed vector) between the instance location in the first instance tracking map and the instance location at the potential collision location. In such cases, the first angle may be the angle between the first and second lines.

Further, the vehicle safety component may determine a second angle based on an absolute displacement of the vehicle between the two maps and an relative displacement between the instance and the vehicle in the first instance tracking frame. That is, the vehicle safety component may determine a first displacement between the location of the vehicle in the first instance tracking map and the location of the vehicle at the potential collision. The vehicle safety component may determine a relative displacement between location of the instance in the first tracking map and the location of the vehicle in the first tracking map. The first absolute displacement may be represented by a (first) line (or directed vector) between the vehicle location in the first instance tracking frame and the vehicle location at the potential collision location. The second absolute displacement may be represented by a (second) line (or directed vector) between the instance location in the first instance tracking frame and the vehicle location in the first instance tracking map. As such, the second angle may be the angle between the first and second lines.

In some examples, the vehicle safety component may determine that the instance is substantially behind the vehicle based on comparing the first and second angles to angle thresholds. That is, the first angle may be compared to a first angle threshold or threshold range (e.g., 0°, 10°, 20°, 30°, between 0°-10°, between 0°-30°, etc.) and the second angle may be compared to a second angle threshold or threshold range (e.g., 0°, 10°, 20°, 30°, between 0°-10°, between 0°-30°, etc.). In such instances, if the first and/or second angles are below the first and/or second thresholds, the vehicle safety component may determine that the instance is substantially behind the vehicle. Conversely, if the first and/or second angles meet or exceed the first and/or second thresholds, the vehicle safety component may determine that the instance is not substantially behind the vehicle. If the vehicle safety component determines that the instance is behind the vehicle (712: Yes), the vehicle safety component may filter the potential collision out and exclude the potential collision from further evaluation. That is, at operation 718, the vehicle safety component may exclude the potential collision from further processing. Alternatively, the vehicle safety component may determine one or more scores associated with the potential collision and based on comparing such scores, the vehicle can determine an action to follow. That is, at operation 720, the vehicle safety component may control the vehicle. In such instances, if the vehicle safety component filtered out the potential collision, the one or more primary systems of the vehicle may determine an action to follow.

In contrast, if the vehicle safety component determines that the instance is not behind the vehicle (712: No), the vehicle safety component may include the potential collision in further evaluation. That is, at operation 714, the vehicle safety component may include the potential collision in further downstream processing. In some instances, the vehicle safety component determines a score associated with the potential collision. The score may represent the potential danger to the vehicle and/or the occupants of the vehicle based on the collision occurring. In some examples, the vehicle safety component may determine a first score based on the danger associated with the potential collision if the vehicle reduces its velocity and a second score based on the danger associated with the potential collision if the vehicle maintains a similar velocity. The vehicle safety component may determine the first and second scores based on various factors, such as a location of the potential collision in the environment (e.g., intersection (e.g., increased likelihood for additional interactions), freeway (e.g., increases score based on the high velocity), etc.), a location of the potential collision to the vehicle (e.g., lower score based on the collision to a longitudinal end of the vehicle, increase score based on the collision to a lateral end of the vehicle, etc.), a location of the occupant(s) within the vehicle (e.g., increase score if the occupant is located on the side of the potential collision), a relative velocity between the vehicle and the instance (e.g., increase score for higher relative velocity (e.g., higher potential for danger), lower score for low relative velocity, etc.), a relative pose (or heading) between the vehicle and the instance (e.g., increase score if there is a large relative heading, decrease score if there is a low relative heading, etc.), and/or any other factor.

Additional or alternative examples of downstream processes for evaluating the potential interactions (or collisions) can be found, for example, in U.S. application Ser. No. 18/193,285, filed Mar. 30, 2023, and titled "Collision Avoidance with Trajectory Evaluation," at U.S. application Ser. No. 17/246,412, filed Apr. 30, 2021, and titled "Velocity Regression Safety System," and at U.S. application Ser. No. 17/815,994, filed Jul. 29, 2022, and titled "Systems and Methods for Rapid Deceleration," the content of each is herein incorporated by reference in its entirety and for all purposes.

At operation 716, the vehicle safety component may control the vehicle based on the first and second scores. Based on determining the first and second scores, the vehicle safety component may determine whether to instruct the vehicle to reduce velocity (or any other type of kinematic parameter) or to maintain a current velocity. That is, if the first score is lower than the second score, the vehicle safety component may instruct the vehicle to reduce vehicle velocity. If the second score is lower than the first score, the vehicle safety component may instruct the vehicle to maintain the current velocity of the vehicle. In such instances, the vehicle may be controlled based on the action determined by the vehicle safety component.

EXAMPLE CLAUSES

A: A system comprising: one or more processors; and one or more non-transitory computer-readable media storing computer-executable instructions that, when executed, cause the system to perform operations comprising: receiving, from a sensor associated with an autonomous vehicle, sensor data associated with an environment; determining, based at least in part on the sensor data, a segmented representation of the environment; determining, based at least in part on the segmented representation of the environment, an object representation including an object; determining, based at least in part on the object representation and a velocity of the object, a predicted representation indicating a predicted location of the object at a future time; determining, based at least in part on the predicted representation and a trajectory of the autonomous vehicle, a potential interaction between the autonomous vehicle and the object; determining, based at least in part on the potential interaction and a relative position associated with the autonomous vehicle and the object, that the object is located at a position behind the autonomous vehicle; and controlling the autonomous vehicle at an exclusion of the object based at least in part on the object being behind the autonomous vehicle.

B: The system of paragraph A, wherein determining that the object is located behind the autonomous vehicle comprises: identifying a second predicted representation indicating a second predicted location of the object at a second future time that is prior to the future time; determining a first direction between the autonomous vehicle at a first location of the potential interaction and a second location of the autonomous vehicle at the second future time; determining a second direction between the object at the first location and a third location of the object at the second future time; determining a third direction between the autonomous vehicle at the second location and third location; determining a first angle between the first direction and the second direction; determining a second angle between the first direction and the third direction; and determining, based at least in part on the first angle and the second angle, that the object is located behind the autonomous vehicle.

C: The system of paragraph B, wherein determining that the object is located behind the autonomous vehicle is based at least on part on: determining that the first angle is below a first threshold and the second angle is below a second threshold.

D: The system of paragraph A, wherein controlling the autonomous vehicle is based at least in part on at least one of: determining that the potential interaction is excluded from a list of potential interactions, or determining, based at least in part on the potential interaction, an action for the autonomous vehicle to follow.

E: The system of paragraph A, wherein controlling the autonomous vehicle is based at least in part on: determining, based at least in part on the autonomous vehicle maintaining a current velocity, a first score associated with the potential interaction with the object; determining, based at least in part on the autonomous vehicle modifying the current velocity, a second score associated with the potential interaction with the object; and determining, based at least in part on comparing the first score with the second score, an action for the autonomous vehicle to follow.

F: One or more non-transitory computer-readable media storing instructions executable by one or more processors, wherein the instructions, when executed, cause a system to perform operations comprising: receiving, from a sensor associated with a vehicle, sensor data associated with an environment; determining, based at least in part on the sensor data, an object representation including an object in the environment; determining, based at least in part on the object representation and a velocity of the object, a predicted representation indicating a predicted location of the object at a future time; determining, based at least in part on the predicted representation and a trajectory of the vehicle, a potential interaction between the vehicle and the object; and determining, based at least in part on the potential interaction and a relative position associated with the vehicle and the object, that the object is located at a position behind the vehicle; and filtering, based at least in part on determining that the object is located behind the vehicle, the object from subsequent processing.

G: The one or more non-transitory computer-readable media of paragraph F, wherein determining that the object is located behind the vehicle comprises: identifying a second predicted representation indicating a second predicted location of the object at a second future time that is prior to the future time; determining a first direction between the vehicle at a first location of the potential interaction and a second location of the vehicle at the second future time; determining a second direction between the object at the first location and a third location of the object at the second future time; determining a third direction between the vehicle at the second location and the third location; determining a first angle between the first direction and the second direction; determining a second angle between the first direction and the third direction; and determining, based at least in part on the first angle and the second angle, that the object is located behind the vehicle.

H: The one or more non-transitory computer-readable media of paragraph G, wherein determining that the object is located behind the vehicle is based at least on part on: determining that the first angle is below a first threshold and the second angle is below a second threshold.

I: The one or more non-transitory computer-readable media of paragraph F, wherein controlling the vehicle is based at least in part on at least one of: determining that the potential interaction is excluded from a list of potential interactions, or determining, based at least in part on the potential interaction, an action for the vehicle to follow.

J: The one or more non-transitory computer-readable media of paragraph F, wherein controlling the vehicle is based at least in part on: determining, based at least in part on the vehicle maintaining a current velocity, a first score associated with the potential interaction with the object; determining, based at least in part on the vehicle modifying the current velocity, a second score associated with the potential interaction with the object; and determining, based at least in part on comparing the first score with the second score, an action for the vehicle to follow.

K: The one or more non-transitory computer-readable media of paragraph J, wherein determining the first score or the second score is based at least in part on at least one of: a first location of the potential interaction within the environment, a second location of the potential interaction to the vehicle, a third location of an occupant within the vehicle, a relative velocity between the vehicle and the object, or a relative pose between vehicle and the object.

L: The one or more non-transitory computer-readable media of paragraph F, wherein the sensor data is received at a first time, and wherein the object representation may be a representation of the environment at one of: 0.5 seconds after the first time, 1 second after the first time, 1.5 seconds after the first time, or 2 seconds after the first time.

M: The one or more non-transitory computer-readable media of paragraph F, the operations further comprising: controlling the vehicle based at least in part on the object being behind the vehicle.

N: The one or more non-transitory computer-readable media of paragraph F, wherein determining the potential interaction comprises: determining, based at least in part on a predicted representation, a track representation that includes an object with an object identifier; and determining, based at least in part on a state of the trajectory and the track, that the vehicle and the object will overlap spatially and temporally.

O: A method comprising: receiving, from a sensor associated with a vehicle, sensor data associated with an environment; determining, based at least in part on the sensor data, an object representation including an object in the environment; determining, based at least in part on the object representation and a velocity of the object, a predicted representation indicating a predicted location of the object at a future time; determining, based at least in part on the predicted representation and a trajectory of the vehicle, a potential interaction between the vehicle and the object; and determining, based at least in part on the potential interaction and a relative position associated with the vehicle and the object, that the object is located at a position behind the vehicle; and filtering, based at least in part on determining that the object is located behind the vehicle, the object from subsequent processing.

P: The method of paragraph O, wherein determining that the object is located behind the vehicle comprises: identifying a second predicted representation indicating a second predicted location of the object at a second future time that is prior to the future time; determining a first direction between the vehicle at a first location of the potential interaction and a second location of the vehicle at the second future time; determining a second direction between the object at the first location and a third location of the object at the second future time; determining a third direction between the vehicle at the second location and the third location; determining a first angle between the first direction and the second direction; determining a second angle between the first direction and the third direction; and determining, based at least in part on the first angle and the second angle, that the object is located behind the vehicle.

Q: The method of paragraph O, wherein controlling the vehicle is based at least in part on at least one of: determining that the potential interaction is excluded from a list of potential interactions, or determining, based at least in part on the potential interaction, an action for the vehicle to follow.

R: The method of paragraph O, wherein controlling the vehicle is based at least in part on: determining, based at least in part on the vehicle maintaining a current velocity, a first score associated with the potential interaction with the object; determining, based at least in part on the vehicle modifying the current velocity, a second score associated with the potential interaction with the object; and determining, based at least in part on comparing the first score with the second score, an action for the vehicle to follow.

S: The method of paragraph R, wherein determining the first score or the second score is based at least in part on at least one of: a first location of the potential interaction within the environment, a second location of the potential interaction to the vehicle, a third location of an occupant within the vehicle, a relative velocity between the vehicle and the object, or a relative pose between vehicle and the object.

T: The method of paragraph O, wherein determining the potential interaction comprises: determining, based at least in part on a predicted representation, a track representation that includes an object with an object identifier; and determining, based at least in part on a state of the trajectory and the track, that the vehicle and the object will overlap spatially and temporally.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and one or more non-transitory computer-readable media storing computer-executable instructions that, when executed, cause the system to perform operations comprising:

receiving, from a sensor associated with an autonomous vehicle, sensor data associated with an environment;

determining, based at least in part on the sensor data, a segmented representation of the environment;

determining, based at least in part on the segmented representation of the environment, an object representation including an object;

determining, based at least in part on the object representation and a velocity of the object, a first predicted representation indicating a first predicted location of the object at a first future time;

determining, based at least in part on the first predicted representation and a trajectory of the autonomous vehicle, a first potential interaction between the autonomous vehicle and the object;

identifying a second predicted representation indicating a second predicted location of the object at a second future time that is prior to the first future time;

determining a first direction between the autonomous vehicle at a first location of the first potential interaction and a second location of the autonomous vehicle at the second future time;

determining a second direction between the object at the first location and a third location of the object at the second future time;

determining a third direction between the autonomous vehicle at the second location and the third location;

determining a first angle between the first direction and the second direction;

determining a second angle between the first direction and the third direction;

determining that the first angle is below a first threshold and the second angle is below a second threshold;

determining, based at least in part on the first angle being below the first threshold and the second angle being below the second threshold, that the object is located at a position behind the autonomous vehicle; and controlling the autonomous vehicle at an exclusion of the object based at least in part on the object being behind the autonomous vehicle.

2. The system of claim 1, wherein controlling the autonomous vehicle is based at least in part on at least one of:

determining that the first potential interaction is excluded from a list of potential interactions, or determining, based at least in part on the first potential interaction, an action for the autonomous vehicle to follow.

3. The system of claim 1, wherein controlling the autonomous vehicle is based at least in part on:

determining, based at least in part on the autonomous vehicle maintaining a current velocity, a first score associated with the first potential interaction with the object;

determining, based at least in part on the autonomous vehicle modifying the current velocity, a second score associated with the first potential interaction with the object; and determining, based at least in part on comparing the first score with the second score, an action for the autonomous vehicle to follow.

4. The system of claim 1, wherein the segmented representation is a semantic segmentation map, the object representation is an object segmentation map, and the first predicted representation is a predicted object segmentation map.

5. The system of claim 1, wherein the velocity of the object is determined based at least in part on an average velocity of pixels corresponding to the object in the segmented representation.

6. One or more non transitory computer readable media storing instructions executable by one or more processors, wherein the instructions, when executed, cause a system to perform operations comprising:

receiving, from a sensor associated with a vehicle, sensor data associated with an environment;

determining, based at least in part on the sensor data, an object representation including an object in the environment;

determining, based at least in part on the object representation and a velocity of the object, a first predicted representation indicating a first predicted location of the object at a first future time;

determining, based at least in part on the first predicted representation and a trajectory of the vehicle, a first potential interaction between the vehicle and the object;

identifying a second predicted representation indicating a second predicted location of the object at a second future time that is prior to the first future time;

determining a first direction between the vehicle at a first location of the first potential interaction and a second location of the vehicle at the second future time;

determining a second direction between the object at the first location and a third location of the object at the second future time;

determining a third direction between the vehicle at the second location and the third location;

determining a first angle between the first direction and the second direction;

determining a second angle between the first direction and the third direction;

determining, based at least in part on the first angle and the second angle, that the object is located at a position behind the vehicle;

filtering, based at least in part on determining that the object is located behind the vehicle, the object from subsequent processing; and controlling the vehicle based at least in part on the object being behind the vehicle.

7. The one or more non transitory computer readable media of claim 6, wherein controlling the vehicle is based at least in part on at least one of:

determining that the first potential interaction is excluded from a list of potential interactions, or determining, based at least in part on the first potential interaction, an action for the vehicle to follow.

8. The one or more non transitory computer readable media of claim 6, wherein controlling the vehicle is based at least in part on:

determining, based at least in part on the vehicle maintaining a current velocity, a first score associated with the first potential interaction with the object;

determining, based at least in part on the vehicle modifying the current velocity, a second score associated with the first potential interaction with the object; and determining, based at least in part on comparing the first score with the second score, an action for the vehicle to follow.

9. The one or more non transitory computer readable media of claim 8, wherein determining the first score or the second score is based at least in part on at least one of: the first location of the first potential interaction within the environment, the second location of the first potential interaction to the vehicle, a location of an occupant within the vehicle, a relative velocity between the vehicle and the object, or a relative pose between vehicle and the object.

10. The one or more non transitory computer readable media of claim 6, wherein the sensor data is received at a first time, and wherein the object representation may be a representation of the environment at one of:

0.5 seconds after the first time, 1 second after the first time, 1.5 seconds after the first time, or 2 seconds after the first time.

11. The one or more non transitory computer readable media of claim 6, wherein determining the first potential interaction comprises:

determining, based at least in part on the first predicted representation, a track representation that includes the object with an object identifier; and determining, based at least in part on a state of the trajectory and the track representation, that the vehicle and the object will overlap spatially and temporally.

12. The one or more non transitory computer readable media of claim 6, wherein the velocity is determined based at least in part on:

determining, based at least in part on the sensor data, a segmented representation of the environment, wherein the velocity of the object is determined based at least in part on an average velocity of pixels corresponding to the object in the segmented representation.

13. The one or more non transitory computer readable media of claim 6, wherein determining that the object is located behind the vehicle is based at least in part on:

determining that the first angle is below a first threshold and the second angle is below a second threshold.

14. A method comprising:

receiving, from a sensor associated with a vehicle, sensor data associated with an environment;

determining, based at least in part on the sensor data, an object representation including an object in the environment;

determining, based at least in part on the object representation and a velocity of the object, a first predicted representation indicating a first predicted location of the object at a first future time;

determining, based at least in part on the first predicted representation and a trajectory of the vehicle, a first potential interaction between the vehicle and the object;

identifying a second predicted representation indicating a second predicted location of the object at a second future time that is prior to the first future time;

determining a first direction between the vehicle at a first location of the first potential interaction and a second location of the vehicle at the second future time;

determining a second direction between the object at the first location and a third location of the object at the second future time;

determining a third direction between the vehicle at the second location and the third location;

determining a first angle between the first direction and the second direction;

determining a second angle between the first direction and the third direction;

determining, based at least in part on the first angle and the second angle, that the object is located at a position behind the vehicle;

filtering, based at least in part on determining that the object is located behind the vehicle, the object from subsequent processing; and controlling the vehicle based at least in part on the object being behind the vehicle.

15. The method of claim 14, wherein controlling the vehicle is based at least in part on at least one of:

determining that the first potential interaction is excluded from a list of potential interactions, or determining, based at least in part on the first potential interaction, an action for the vehicle to follow.

16. The method of claim 14, wherein controlling the vehicle is based at least in part on:

determining, based at least in part on the vehicle maintaining a current velocity, a first score associated with the first potential interaction with the object;

determining, based at least in part on the vehicle modifying the current velocity, a second score associated with the first potential interaction with the object; and determining, based at least in part on comparing the first score with the second score, an action for the vehicle to follow.

17. The method of claim 16, wherein determining the first score or the second score is based at least in part on at least one of: the first location of the first potential interaction within the environment, the second location of the first potential interaction to the vehicle, a location of an occupant within the vehicle, a relative velocity between the vehicle and the object, or a relative pose between vehicle and the object.

18. The method of claim 14, wherein determining the first potential interaction comprises:

determining, based at least in part on the first predicted representation, a track representation that includes the object with an object identifier; and determining, based at least in part on a state of the trajectory and the track representation, that the vehicle and the object will overlap spatially and temporally.

19. The method of claim 14, wherein the velocity is determined based at least in part on:

determining, based at least in part on the sensor data, a segmented representation of the environment, wherein the velocity of the object is determined based at least in part on an average velocity of pixels corresponding to the object in the segmented representation.

20. The method of claim 14, wherein determining that the object is located behind the vehicle is based at least in part on:

determining that the first angle is below a first threshold and the second angle is below a second threshold.

* * * * *